(12) United States Patent
Cheng et al.

(10) Patent No.: US 8,515,496 B2
(45) Date of Patent: Aug. 20, 2013

(54) ANTENNA DEPLOYMENT SWITCHING FOR DATA COMMUNICATION OF A USER DEVICE

(75) Inventors: Zhaojun Cheng, British Columbia (CA); Khaled A. Obeldat, Santa Clara, CA (US); Mark Corbridge, Los Gatos, CA (US); Cheng-Jung Lee, Santa Clara, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/326,664

(22) Filed: Dec. 15, 2011

(65) Prior Publication Data

US 2013/0156080 A1  Jun. 20, 2013

(51) Int. Cl.
*H04M 1/00* (2006.01)
*H03C 7/02* (2006.01)

(52) U.S. Cl.
USPC .......................... 455/562.1; 455/101; 343/702

(58) Field of Classification Search
None
See application file for complete search history.

(56) References Cited

U.S. PATENT DOCUMENTS

| 2007/0238496 | A1* | 10/2007 | Chung et al. | 455/575.7 |
| 2009/0295648 | A1* | 12/2009 | Dorsey et al. | 343/702 |
| 2011/0250928 | A1* | 10/2011 | Schlub et al. | 455/550.1 |

* cited by examiner

*Primary Examiner* — Erika A Washington
(74) *Attorney, Agent, or Firm* — Lowenstein Sandler LLP

(57) ABSTRACT

Methods and systems for selecting one of a plurality of antennas to be used as a transmit antenna based on an orientation of a user device are described. A user device determines an orientation of the user device, and selects one of multiple antennas to use as a first transmit antenna based on the orientation of the user device. The user device transmits information using the first transmit antenna.

34 Claims, 13 Drawing Sheets

ANTENNA DEPLOYMENT SWITCHING FOR DATA COMMUNICATION OF A USER DEVICE

BACKGROUND OF THE INVENTION

A large and growing population of users enjoy entertainment through the consumption of digital media items, such as music, movies, images, electronic books, and so on. Users employ various electronic devices to consume such media items. Among these electronic devices are electronic book readers, cellular telephones, personal digital assistants (PDAs), portable media players, tablet computers, netbooks, and the like. These electronic devices wirelessly communicate with a communications infrastructure to enable the consumption of the digital media items. Typically, the communications infrastructure dictates transmit power levels for the electronic devices to use when transmitting data to the communications infrastructure. The electronic devices do not include antenna deployment managers for making their own determinations regarding what transmit power levels to use.

Some bodies of research suggest that radiation output by electronic devices during wireless transmission of data can cause damage to the human body when such radiation is absorbed. However, since electronic devices may have limited ability to control their transmit power levels, it may be difficult for such electronic devices to reduce user exposure to radiation. This may also cause these electronic devices to fail to comply with FCC regulations regarding the specific absorption rate (SAR) permitted to electronic devices. SAR is a measure of the rate at which energy is absorbed by the body when exposed to a radio frequency (RF) electromagnetic field. In addition, the user's body can block the RF electromagnetic field in the direction of the user's body, thus reducing the gain in that direction. This may also cause difficulty in meeting the SAR requirements.

Some electronic devices are capable of connecting with multiple wireless communication infrastructures concurrently. Each such connection to a wireless communication infrastructure causes radiation to be emitted, thus causing such devices to expose users to electromagnetic radiation.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION OF THE PRESENT INVENTION

Methods and systems for selecting one of a plurality of antennas to be used as a transmit antenna based on an orientation of a user device are described. A user device determines an orientation of the user device, and selects one of multiple antennas to use as a first transmit antenna based on the orientation of the user device. The user device transmits information using the first transmit antenna.

The user device may be any content rendering device that includes a wireless modem for connecting the user device to a network. Examples of such user devices include electronic book readers, cellular telephones, personal digital assistants (PDAs), portable media players, tablet computers, netbooks, and the like.

Figure 1:
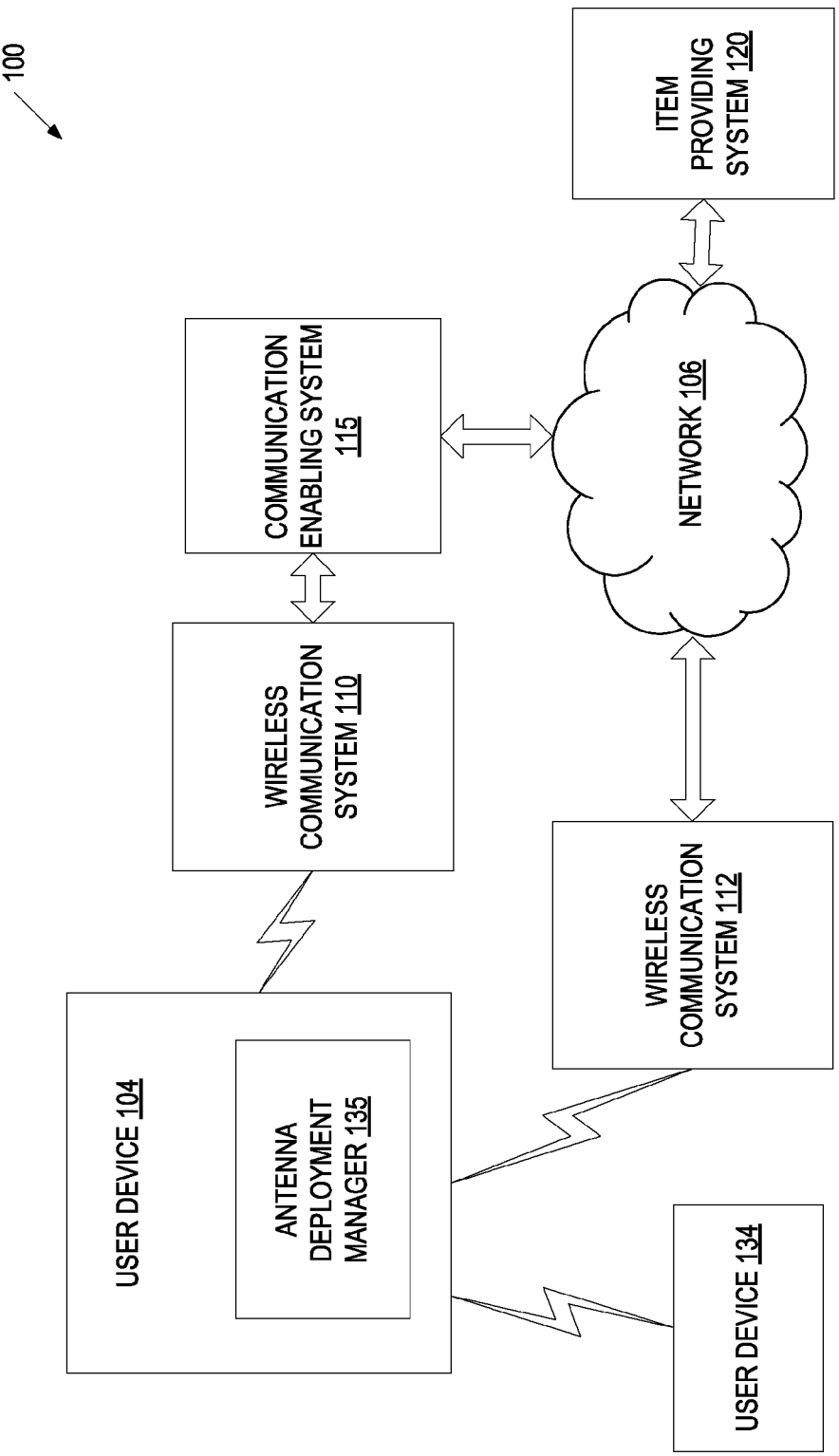
FIG. 1 is a block diagram of an exemplary network architecture in which embodiments of an antenna deployment manager may operate.

FIG. 1 is a block diagram of an exemplary network architecture 100 in which embodiments of an antenna deployment manager 135 may operate. The network architecture 100 may include an item providing system 120 and one or more user devices 104 capable of communicating with the item providing system 120 via a network 106 (e.g., public network such as the Internet or private network such as a local area network (LAN)).

The user devices 104 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 104 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The item providing system 120 and the user devices 104 deliver and/or receive items, upgrades, and/or other information via the network 106. For example, the user devices 104 may download or receive items from the item providing system 102. The item providing system 120 also receives various requests, instructions and other data from the user devices 104 via the network 106. The item providing system 120 may include one or more machines (e.g., one or more server computer systems, routers, gateways, etc.) that have processing and storage capabilities to provide the above functionality.

Communication between the item providing system 120 and the user device 104 may be enabled via any communication infrastructure. One example of such an infrastructure includes a combination of a wide area network (WAN) and wireless infrastructure, which allows a user to use the user device 104 to purchase items and consume items without being tethered to the item providing system 120 via hardwired links. The wireless infrastructure may be provided by one or multiple wireless communications systems, such as wireless communications system 110 and wireless communication system 112. One of the wireless communication systems 110, 112 may be a wireless fidelity (WiFi) hotspot connected with the network 106. Another of the wireless communication systems 110, 112 may be a wireless carrier system that can be implemented using various data processing equipment, communication towers, etc. Alternatively, or in addition, the wireless carrier system may rely on satellite technology to exchange information with the user device 104.

The communication infrastructure may also include a communication-enabling system 115 that serves as an intermediary in passing information between the item providing system 120 and the wireless communication system 110. The communication-enabling system 115 may communicate with the wireless communication system 110 (e.g., a wireless carrier) via a dedicated channel, and may communicate with the item providing system 120 via a non-dedicated communication mechanism, e.g., a public Wide Area Network (WAN) such as the Internet.

In one embodiment, while the user device 104 is connected with the wireless communication system 110 and/or wireless communication system 112, one or both of the wireless communication systems periodically or continuously specifies transmit power levels for the user device 104 to use for transmissions to that wireless communication system 110, 112. For example, conventional wireless carrier systems typically dictate what transmit power levels mobile phones are to use for communications with the wireless carrier systems. The transmit power levels that the wireless carrier systems specify continuously vary based on environmental factors such as a current signal to noise ratio, distance between the mobile phone and a nearest cell tower, obstacles between the mobile phone and the nearest cell tower, and so on. Unfortunately, wireless communication systems 110, 112 typically consider only signal strength when specifying what transmit power levels the user device is to use in transmissions of data. Wireless communication systems 110, 112 typically do not take into consideration radiation emitted by the user device 104 that may be absorbed by users of the user device 104, interference with other wireless connections, battery life of the user device 104, or other factors that may also be important to a user when specifying transmit power levels. Additionally, the user device 104 may have additional information that is not available to the wireless communication systems 110, 112. This additional information may be used to help determine what transmit power levels should be used. For example, the additional information may be whether the user device is in proximity with a human body part, and reduce the power accordingly. This additional information may also be used to determine which antennas to be used for data transmission and which antennas to be used for data reception, as well as switching the antennas to different configurations based on this information.

In one embodiment, the user device 104 includes an antenna deployment manager 135 to determine the orientation of the user device based on motion data or sensor data of the user device, and to select the appropriate antennas for data transmission and data reception based on the orientation. Alternatively, the user device 104 determines which antennas to use for data transmission based on other criteria, such as receive signal conditions as described herein.

The embodiments described herein use multiple antennas to communication, but select the appropriate antennas for transmitting data based on the orientation of the user device, as well as other conditions as described herein. Thus, as the orientation of the user device changes, for example, the user device can switch between the antennas to select the most appropriate antennas for the transmit antenna(s) as described herein.

In addition to, or in place of, other efforts to control the transmit power levels of the user device independent of the specified transmit power levels dictated by the wireless communication systems 110, 112, the embodiments described herein can reduce the amount of radiation being absorbed by the user to comply with SAR by switching antennas for data transmission, as well as increase throughput and other benefits as would be appreciated by one of ordinary skill in the art having the benefit of this disclosure. The embodiments described herein overcome the above shortcomings by switching which of the multiple antennas should be used for the transmit antenna based on the orientation of the user device. The orientation may be determined in various ways, but, in one embodiment, the orientation is determined using one or more proximity sensors, one or more inertial sensors, or any combination thereof. When the user device is touching or in close proximity to a human body part, the user device can determine the orientation of the user device and switch the transmit antenna to be the antenna farthest away from the user as determined by the sensor data from the proximity sensor(s) and/or motion data from the inertial sensor(s). By switching the transmit antenna to be the antenna farthest from the user, SAR is reduced for the user device. In other embodiments, the transmit antenna's deployment can achieve other benefits than reduction in SAR, as would be appreciated by one of ordinary skill in the art having the benefit of this disclosure. Alternatively, the transmit antenna may be selected as at least not the closest antenna. For example, the transmit antenna can be selected based on the antenna that is least likely to dose the user in an undesirable way even if the selected antenna is not technically the farthest way from the user.

In one embodiment, the antenna deployment manager 135 is configured to perform antenna deployment switching based on motion data, such as acceleration data. This can be done to improve diversity or multiple-input multiple-output (MIMO) performance. This can also be done to improve SAR. In one embodiment, the user device includes four WAN antennas for deployment switching. In another embodiment, the user device includes two or more WAN antennas. In one embodiment, the user device may use HSPA+ WAN technology with two diversity antennas. In order to maintain good performance and/or decrease the effects of SAR by a user, the antenna deployment manager 135 can maintain the WAN Tx antenna (also referred to a primary transmit antenna herein) on the top side of the user device, such as in a top position of the user device (e.g., tablet computer), regardless of how the user device is being held by the user. This allows the Tx antenna to be far away from the body. The antenna deployment manager 135 can use the motion data to determine or define the orientation of the user device, and switch the Tx antenna to be one of the four antennas that is in the top position.

In another embodiment, the antenna deployment manager 135 is configured to perform antenna deployment switching based on receive signal conditions of the antennas, such as using Receive Signal Strength Indicator (RSSI) detection. RSSI is a measurement of the power present in a received radio signal. This can be done to improve diversity or MIMO performance. This can also be done to improve SAR. In one embodiment, the user device may use four antennas on each side of the user device, such as tablet computer. When an antenna is close to the human body part, such as the hand, performance of the antenna may be impacted. The antennas performance may be determined by monitoring the RSSI of each of the antennas. If the Tx antenna is arranged to a human body part, the effects of SAR may increase too, possibly failing to comply with SAR requirements. The antenna deployment manager 135 can switch the Tx paths between the four antennas based on RSSI monitoring. If the RSSI of the current Tx antenna drops below a defined threshold, the antenna deployment manager 135 can switch the Tx path to the antenna which has the best RSSI. For HSPA+ diversity or MIMO, switching the Tx path to the antenna with the best RSSI and switching the diversity antenna or a second MIMO antenna to the antennas with the second best RSSI. In another embodiment, the antenna deployment manager 135 can use the receive signal condition to effectively determine an orientation of the user device, and to the Tx antenna to be one of the four antennas with the best receive signal condition, regardless of its current position for the current orientation.

In another embodiment, the antenna deployment manager 135 is configured to perform antenna deployment switching based on receive signal conditions of the antennas, such as using Receive Signal Strength Indicator (RSSI) detection, and motion data. In one embodiment, the antenna deployment manager 135 can monitor the RSSI and switch the Tx antenna to the top antenna based on the orientation of the device, as determined by the motion data. Then the antenna deployment manager 135 can check RSSI of the antennas to quickly determine if another antenna than the top antenna has a better RSSI, and if so, the antenna deployment manager 135 may switch the Tx antenna to the antennas having the better RSSI. Similarly, the antenna deployment manager 135 can select a second antenna for the diversity antenna or a second MIMO antenna to the antenna with the second best RSSI. Alternatively, the antenna deployment manager 135 can use the motion data and RSSI in other ways to perform antenna deployment switching as would be appreciated by one of ordinary skill in the art having the benefit of this disclosure.

In another embodiment, the antenna deployment manager 135 is configured to perform antenna deployment switching based on motion data, and throughput (e.g., HSPA+ throughput) to improve diversity or MIMO performance and/or SAR. In one embodiment, the antenna deployment manager 135 can deploy four antennas on each side of a table computer (or other user device). As the antennas are close to a human body part, the performance of the antenna will be decreased. Also, if the Tx antenna is arranged close to the hand hold or other body part, the user device may fail to comply with SAR requirements. When using HSPA+ technology with diversity antenna, or even MIMO antennas, the antenna deployment manager 135 can select the top antenna for the Tx antenna, based on the orientation as determined by the motion data, and then can determine which of the other three antennas has the best throughput for the diversity antenna or second MIMO antenna. This WAN Tx antenna switching between the four antennas based on motion data and on higher HSPA throughput can be used for diversity or MIMO antenna switching.

In another embodiment, the user device 104 may use WiFi technology, which may use MIMO 2×2 technology (two Tx antennas and two Rx antennas). These four antennas can be disposed at each side of the user device 104. The antenna deployment manager 135 can switch the main antenna and MIMO antennas between the four antennas. In this embodiment, the antenna deployment manager 135 attempts to deploy the primary Tx antennas as far as possible away from the user. This may be the top position of the user device based on the orientation or may be another position. In one embodiment, the antenna deployment manager 135 defines the orientation of the user device 104 using the motion data, and finds the top antennas. The antenna deployment manager 135 switches the WiFi Tx path to the top antenna. The antenna deployment manager 135 switches the MIMO antenna between the other three antennas based on signal condition or throughput, such as by determining which of the three has the highest throughput. In another embodiment, after selecting the Tx antennas and the MIMO antenna, the antenna deployment manager 135 can monitor the RSSIs of the four antennas to verify that the top antennas is not covered by a hand or human body part. If the top antenna is covered or in close proximity to the human body part, the antenna deployment manager 135 can switch the WiFi Tx path to one of the other three antennas with the highest RSSI as the Tx antenna, and switch the MIMO path to one of the other three antennas based on throughput, for example.

In another embodiment, the antenna deployment manager 135 is configured to perform antenna deployment switching based sensor data from one or more proximity sensors. In one embodiment, as the user device 104 detects an object, such as a human body part, the antenna deployment manager 135 can switch the Tx path to one of the antennas that is not being touched or near the human body part. In one embodiment, one or more proximity sensors can be disposed by each of the two or more antennas. Based on the sensor data, the antenna deployment manager 135 can determine which of the antennas are not being touched or that are not near the human body part. The antenna deployment manager 135 can select one of those antennas to reduce SAR. In another embodiment, the antenna deployment manager 135 can select a diversity or MIMO antenna from the additional antennas in order to get the best HSPA+ diversity or MIMO diversity. This may protect the human body part from excessive absorption of radiation while getting better performance (e.g., throughput) for the user device 104.

Because of five axis FCC new SAR requirements for tablet computers, the embodiments described herein may use two, three, four, or more antennas disposed along different sides of the tablet computer's physical dimensions. As described herein, in some embodiments, the antenna deployment manager 135 can perform antenna deployment switching to force the antenna closest to a human body part to be an Rx antenna, while other antenna(s) may be used to as Tx antennas or other Rx antennas. In one embodiment, since the display face is not subjected to SAR requirements, the two or more antennas may be disposed on the display side of the user device 104. Alternatively, the two or more antennas may be disposed in other positions and at other locations of the user device 104 as would be appreciated by one of ordinary skill in the art having the benefit of this disclosure.

In one embodiment, the antenna deployment manager 135 can switch the Tx paths and Rx paths to the two antennas using a switch. For example, an external cross switch 2 pole double throw (2PDT) may be used for a two antenna scheme. The switch can be an intermediate stage between the antenna deployment manager 135 and two antennas such that the antenna deployment manager 135 can switch one antenna OFF and the other one ON based on the antenna deployment switching being performed by the antenna deployment manager 135. In one embodiment, the antenna deployment manager 135 receives input, such as sensor data from one or more proximity sensors, motion data from one or more inertial sensors, RSSIs of the antennas, or any combination thereof to make a determination of the orientation of the user device, and the subsequent determination of how to deploy the antennas. In one embodiment, using the 2PDT switch, an external low-noise amplifier (LNA) can be used to reduce Noise Figure (NF) due to the added insertion loss (IL) from the switch. LNA is an electronic amplifier used to amplify very weak signals. NF is a measure of degradation of the signal-to-noise ratio (SNR) caused by components in a radio frequency (RF) signal chain. The noise figure is defined as the ratio of the output noise power of the user device to the portion thereof attributable to thermal noise in the input termination at standard noise temperature $T_0$ (usually 290 K). The noise figure is thus the ratio of actual output noise to that which would remain if the device itself did not introduce noise. It is a number by which the performance of a radio receiver can be specified.

In another embodiment, multiple switches can be used to switch the Tx paths and Rx paths to the two or more antennas using one or more switches. In another embodiment, the antenna deployment manager 135 includes one or more internal switches with multiple receiving and transmitting branches or channels that can be connected to the two or more antennas. Alternatively, other switching techniques may be used to select an appropriate deployment of the multiple antennas and to control the switching of the Tx paths and Rx paths accordingly as would be appreciated by one of ordinary skill in the art having the benefit of this disclosure.

Figure 2:
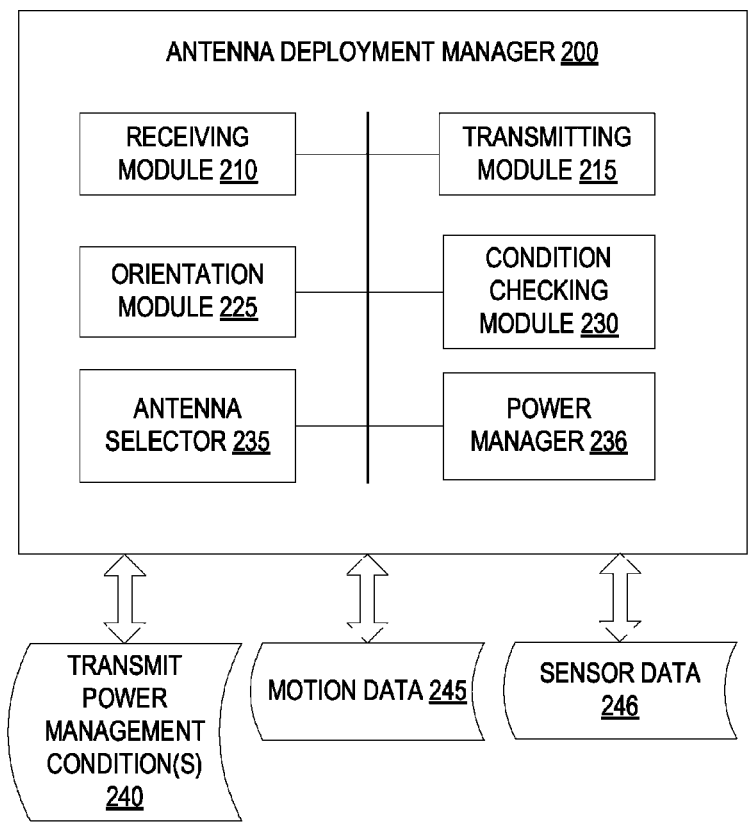
FIG. 2 is a block diagram of one embodiment of an antenna deployment manager.

FIG. 2 is a block diagram of one embodiment of an antenna deployment manager 200, which may correspond to the antenna deployment manager 135 of FIG. 1. In one embodiment, the antenna deployment manager 200 includes a receiving module 210, a transmitting module 215, an orientation module 225, an antenna selector 235, a condition checking module 230, and a power manager 236. The receiving module 210 receives commands to transmit data. The commands to transmit data may identify the specified transmit power levels for the particular wireless technology, or other parameters regarding data transmission to the wireless carrier and data reception from the wireless carrier. For example, the commands may specify that a transmit power level of +33 dbm is to be used, or may specify a current transmit power level as a change from a previously used transmit power level (e.g., an increase of 1 dbm or a decrease of 2 dbm). Commands may also indicate that a previously specified transmit power level should be used. Commands may originate from the wireless communication system, and may be routed to the antenna deployment manager 200 by a wireless modem and/or processor of the user device. These commands may also be received from other sources, such as applications running on the user device.

Condition checking module 230 determines whether any transmit power management conditions 240 apply to transmissions that are to be made. The transmit power management conditions 240 may include safety conditions, communications interference conditions, battery level conditions, power consumption conditions, and so on. The transmit power management conditions 240 may apply to communications via a particular wireless communication protocol, with a particular wireless communication system, associated with a particular application, etc. Some transmit power management conditions 240 may apply to multiple wireless protocols, wireless communications systems, applications, etc. For those transmit power management conditions 240 that apply to a current transmission, condition checking module 230 determines whether the conditions will be violated by the current transmission. For example, condition checking module 230 may determine whether transmit power management conditions will be violated by transmitting data at the specified transmit power level.

In one embodiment, the transmit power management conditions 240 include a human body part proximity condition. This condition may be violated (or alternatively satisfied) when a human body part is detected (e.g., when a user is holding the user device), or when a user device determines that a human body part is closer than a predetermined distance from an antenna of the user device. In one embodiment, the human body part proximity condition may be determined based on sensor data 246. The sensor data 246 may be received from one or more proximity sensors. In another embodiment, the human body part proximity condition may be determined based on motion data 245. The motion data 245 may be received from one or more inertial sensors. Although these conditions may be used to determine whether to transmit or not, and whether to throttle power using the power manager 236, these human body part proximity conditions may also be used to determine whether the human body part is detected proximate to a particular antennas or within a specified distances, which antennas is the farthest from the human body part, an orientation of the user device with respect to the human body part, or the like. The proximity of the human body part may be determined using various techniques as would be appreciated by one of ordinary skill in the art.

In another embodiment, the transmit management conditions 240 may include a user interaction condition indicative that a user is currently using the user device 104 to infer that a human body part is touching or in close proximity to the user device. In one embodiment, the human body part proximity condition or the user interaction condition may be computed by the processor (or other component) and provided as one of the transmit power management conditions 240 to the antenna deployment manager 240. Alternatively, the antenna deployment manager 200 may use the sensor data 246, motion data 245, or other user input data, to determine the human body part proximity condition or the user interaction condition based on the sensor data 246, motion data 245, or other input, such as one or more of the conditions described herein. In one embodiment, the orientation module 225 these various types of inputs to determine an orientation of the user device 104, and provides the orientation to the antenna selector 235, which selects which antennas are to be used for data transmission and which are to be used for data reception as described herein. In another embodiment, the antenna selector 235 can receives the various types of inputs, as well as an orientation from the orientation module 225 to determine the antenna deployment.

The power management conditions 240 may include other conditions, such as maximum accumulated transmit power level condition that can be used separately or in combination with some of the other conditions to determine if the condition is violated, and to take appropriate action based on the violation. Another example is a communications interference condition for when there are two or more concurrent connections with different wireless communication system and/or user device. Another example is an active application condition that can be satisfied when a particular application (e.g., an ad hoc network application) is running on the user device or when a particular operation of a specified application is to be performed (e.g., a file transfer operation). Another example is a security condition, such as a maximum transmit distance condition, which may be satisfied when certain applications are active, when certain operations are being performed and/or when certain types of wireless connections are established. The maximum transmit distance condition may cause a transmit power level to be reduced to a level just powerful enough to transmit to nearby devices (e.g., to devices within a range of 6 feet from the user device) in order to increase transmission security by preventing devices outside of a maximum distance from receiving transmissions. The power management conditions 240 may also include orientation conditions. For example, the condition checking module 230 may receive an orientation of the user device and provide this information to the antenna selector 235 to select the appropriate deployment of the antennas for data transmission and data reception. These conditions may also be used as input to the orientation module 225 or the antenna selector 235 for determining an orientation, determining an antenna deployment, determining whether to switch the antenna deployment, or the like.

Another example is a negative power throttling condition that specifies when power throttling should not occur. For example, one or more negative power throttling conditions can specify that, regardless of other power management conditions that may be violated, power throttling should not occur if a particular application is active, or a particular operation is being performed. For example, a power management condition may specify that transmit power level throttling should not occur while media items are being downloaded. Alternatively, the power management condition may specify that the transmit power level throttling should not occur when the data being transmitted is signaling data. Signaling data may be the data that is communicated to and from the wireless communication network and the user device to facilitate communication, such as voice data and non-voice data. It may be beneficial to allow this type of communication with the specified transmit power level, while power throttling non-voice data that can be retransmitted. In another embodiment, the transmit power level throttling may not occur when the data being transmitted is voice data, allowing a user to maintain an acceptable signal level to continue a telephone call. Alternatively, other conditions may be apply where power level throttling should not occur as would be appreciated by one of ordinary skill in the art having the benefit of this disclosure. These conditions may also be used as input to the orientation module 225 or the antenna selector 235 for determining an orientation, determining an antenna deployment, determining whether to switch the antenna deployment, or the like.

The transmit power management conditions 240 may be stored in volatile or nonvolatile memory of the user device 104. In one embodiment, the power management conditions 240 are hard coded into the user device, and cannot be modified. Alternatively, the transmit power management conditions 240 may be updated by modifying existing power management conditions, adding new power management conditions, or deleting existing power management conditions.

Returning to FIG. 2, in one embodiment, the antenna deployment manager 200 includes an orientation module 225 that determines an orientation of the user device. The orientation module 225 may receive the orientation from the condition checking module 230, or may receive the orientation from the processor. Alternatively, the orientation module 225 may determine the orientation itself using the sensor data 246, the motion data 245, conditions detected by the condition checking module 230, or any combination thereof. In another embodiment, the orientation module 225 may use receive signal conditions of the antennas to determine the orientation for switching the antennas in different configurations based on the orientation.

The antenna deployment manager 200 includes an antenna selector 235. The antenna selector 235 receives the orientation from the orientation module 225, or alternatively from the condition checking module 230 or the processor. Using the orientation, the antenna selector 235 selects which antennas should be used for data transmission and which antennas should be used for data transmission. Alternatively, the antenna selector 235 may receive various inputs to make the determination, including an orientation as determined by the orientation module 225. In one embodiment, the user device includes multiple antennas for deployment in different configurations, such as different MIMO configurations, single-input and multiple-output (SIMO) configurations, and multiple-inputs and single-output (MISO) configurations. In another embodiment, the user device includes multiple antennas for deployment in different diversity configurations.

In one embodiment, the power manager 236 reduces a transmit power level used to transmit data to the wireless carrier system by changing the power class when one or more transmit power management conditions 240 have been violated. In another embodiment, the power manager 236 can be used to reduce the power by reducing a number of transmit slots per frame. For example, the power manager 236 can receive an indication from the condition checking module 230 that the human body party proximity condition or the user interaction condition have been violated, and accordingly, reduce two transmit slots per frame to one transmit slots per frame for data transmission. In another embodiment, the power manager 236 can be used to change a GPRS multi-slot class, such as from GPRS class 10 to GPRS class 8. In another embodiment, the power manager 236 can be used to change a power class from a higher-power class to a lower-power class. The power manager 236 may also reduce the transmit power level below a specified transmit power level incrementally by incrementally transitioning to lower power classes, a lower multi-slot class, or by manually throttling the power in steps. In one embodiment, a suitable transmit power level is an output level that will not cause any of the transmission power management conditions to be violated. Alternatively, a suitable transmit power level may be a level that will cause the transmission power management condition to stop being violated at some point in the future. For example, a suitable transmit power level may cause a trend towards eventual compliance with the violated transmission power management conditions 240.

Alternatively, the power manager 236 may compute or otherwise identify a suitable transmit power level, and reduce the current transmit power level to the suitable transmit power level in a single action using the appropriate power class or multi-slot class or by reducing the number of transmit slots per frame. For example, a transmit power management condition 240 may specify that when the human body part proximity condition or the user interaction condition is violated, the number of transmit slots per frame should be reduced to a predetermined number. Alternatively, the number of transmit slots per frame may be adjusted incrementally until the current transmit power level is at a suitable level.

Power manager 236 may also reduce a duty cycle for the transmissions (e.g., space out the transmissions over time). Therefore, the power manager 236 may adjust both the transmit power levels used for transmission via the declared power classes, for example, and the frequency of those transmissions.

In one embodiment, transmitting module 215 transmits data to a wireless communication system or additional user device at either a specified transmit power level (e.g., as specified by the wireless communication system) or at a transmit power level determined by the power manager 236. In another embodiment, transmitting module 215 transmits data to a wireless communication system or additional user device with a first power class or multi-slot class or with a new reduced power class or multi-slot class as determined by the power manager 236. The transmitting module 215 may transmit the data through one or more antennas included in the user device.

In addition to wirelessly connecting to a wireless communication system 110, 112, the user device 104 may also wirelessly connect with other user devices (e.g., user device 134). For example, user device 104 may form a wireless ad hoc (peer-to-peer) network with user device 134. In addition to controlling the antenna deployment switching used to communicate with the wireless communication systems 110, 112, the antenna deployment manager 200 may also control the antenna deployment switching used to communicate with other user devices 134.

It should be noted that the modules of the antenna deployment manager 200 may be hardware, software, or any combination thereof. The components of the antenna deployment manager 200 may be coupled using a bus, communication channels, or other types of interfaces between the components. In another embodiment, the separate modules may be integrated together into one or more modules. For example, the orientation module 225 may be combined with the antenna selector into a single component as would be appreciated by one of ordinary skill in the art having the benefit of this disclosure.

Figure 3:
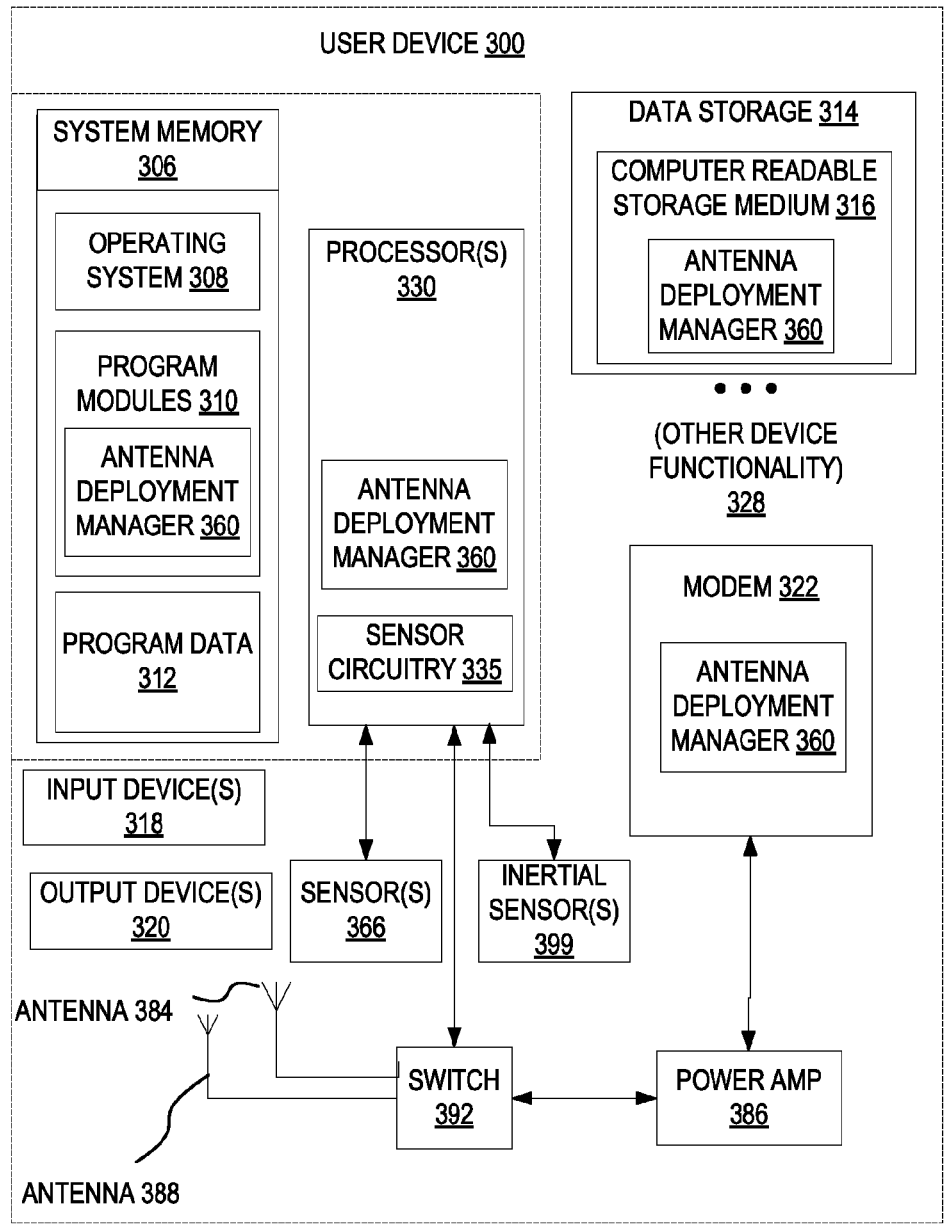
FIG. 3 is a block diagram illustrating one embodiment of an exemplary user device.

FIG. 3 is a block diagram illustrating an exemplary user device 300. The user device 300 may correspond to the user device 104 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like.

The user device 300 includes one or more processors 330, such as one or more CPUs, microcontrollers, field programmable gate arrays, or other types of processors. The user device 300 also includes system memory 306, which may correspond to any combination of volatile and/or non-volatile storage mechanisms. The system memory 306 stores information which provides an operating system component 308, various program modules 310 such as antenna deployment manager 360, program data 312, and/or other components. The user device 300 performs functions by using the processor(s) 330 to execute instructions provided by the system memory 306.

The user device 300 also includes a data storage device 314 that may be composed of one or more types of removable storage and/or one or more types of non-removable storage. The data storage device 314 includes a computer-readable storage medium 316 on which is stored one or more sets of instructions embodying any one or more of the methodologies or functions described herein. As shown, instructions for the antenna deployment manager 360 may reside, completely or at least partially, within the computer readable storage medium 316, system memory 306 and/or within the processor(s) 330 during execution thereof by the user device 300, the system memory 306 and the processor(s) 330 also constituting computer-readable media. The user device 300 may also include one or more input devices 318 (keyboard, mouse device, specialized selection keys, etc.) and one or more output devices 320 (displays, printers, audio output mechanisms, etc.).

The user device 300 further includes a wireless modem 322 to allow the user device 300 to communicate via a wireless network (e.g., such as provided by the wireless communication system) with other computing devices, such as remote computers, the item providing system, and so forth. The wireless modem 322 allows the user device 300 to handle both voice and non-voice communications (such as communications for text messages, multimedia messages, media downloads, web browsing, etc.) with the wireless communication system 110. The wireless modem 322 may also allow the user device 300 to handle other signaling data to facilitate communication of the voice and non-voice data between the user device 300 and the wireless communication system 110. The wireless modem 322 may provide network connectivity using any type of mobile network technology including, for example, cellular digital packet data (CDPD), GPRS, EDGE, universal mobile telecommunications system (UMTS), 1 times radio transmission technology (1×RTT), evaluation data optimized (EVDO), high-speed down-link packet access (HSDPA), WiFi, Long Term Evolution (LTE) and LTE Advanced (sometimes generally referred to as 4G), etc. In one embodiment, the wireless modem includes the antenna deployment manager 360 in addition to, or instead of, the antenna deployment manager 360 being included in the computer readable storage medium 316, system memory 306 and/or processor(s) 330. The antenna deployment manager 360 may be implemented as hardware, firmware and/or software of the wireless modem 322. It should be noted that the modem 322 may include a processing component that performs various operations to handle both voice and non-voice communications. This processing component can execute the antenna deployment manager 360. Alternatively, the antenna deployment manager 360 can be executed by a processing component of the user device, such as the processor 330 or other types of processing device as would be appreciated by one of ordinary skill in the art having the benefit of this disclosure.

The wireless modem 322 may generate signals and send these signals to power amplifier (amp) 380 for amplification, after which they are wirelessly transmitted via antenna 384 or antenna 388. A switch 392 is coupled between the power amp 380 and the two antennas 384, 388. In one embodiment, the switch 382 is controlled by the processor(s) 330. In another embodiment, the switch 392 is controlled by the wireless modem 322. In one embodiment, the antenna 384 is selected as the Tx antenna and the Tx path of the wireless modem 322 is coupled to the antenna 384 for data transmission. The antennas 384, 388 may be directional, omnidirectional or non-directional antennas. In addition to sending data, antennas 384, 388 can be deployed to receive data, which is sent to wireless modem 322 and transferred to processor(s) 330.

Though a single modem 322 is shown to control transmission to both antennas 384 and 388, the user device 300 may alternatively include multiple wireless modems. In one embodiment, each modem includes an independent antenna deployment manager 360. Alternatively, a single antenna deployment manager (e.g., that is included in system memory 306, processor 330 and/or data storage 314) may control the antenna deployment switching for each of the wireless modems. In addition, the user device 300, while illustrated with two antennas 384, 388, may include more than two antennas in various embodiments.

In one embodiment, user device 300 includes one or more sensors 366 such as a physical contact sensor or close proximity sensors. The sensors 366 can detect the human body parts proximate to the user device, and convey information regarding the detection to processor(s) 330. In one embodiment, the sensors 366 may be capacitive sensors that are configured to measure capacitance generated by the human body part proximate to the user device using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 366 may also be optical (e.g., infrared) sensors that use an emitter and receiver pair to detect the presence of opaque objects. Alternatively, the sensors 366 may be inductive sensors, which include an inductive loop. When the presence of a human body part (or metal object) is brought close to the inductive sensor, an induction of the inductive loop changes, causing the human body part to be detected. Alternatively, the sensors 366 may be ultrasonic sensors that emit an ultrasonic signal and measure a time duration between when a signal is transmitted and the reflection of that signal received (a.k.a., flight response). The sensors 366 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. It should also be noted that the sensors 366 may be used to determine a distance between one or more of the antennas and the detected human body part. Though the detected object is described herein as a human body part, other types of objects may also be detected depending on the sensing technologies used. As described herein, the sensor data from the one or more sensors 366 may be used to determine an orientation of the user device 300 for antenna deployment switching.

In one embodiment, user device 300 includes one or more inertial sensors 399. The inertial sensors 399 can be used to detect motion of the user device 300. In one embodiment, the inertial sensors 399 detect linear accelerations (translational movement) and angular accelerations (rotational movement). The inertial sensors 399 may include accelerometers and/or gyroscopes. Gyroscopes use principals of angular momentum to detect changes in orientation (e.g., changes in pitch, roll and twist). Accelerometers measure accelerations along one or more axes (e.g., translational changes). The gyroscope and accelerometer may be separate sensors, or may be combined into a single sensor. The inertial sensors 399 in one embodiment are micro-electromechanical systems (MEMS) sensors. As described herein, the motion data from the one or more inertial sensors 399 may be used to determine an orientation of the user device 300 for antenna deployment switching.

The processor(s) 330 may include sensor circuitry 335 (e.g., sensor device drivers) that enables the processor(s) 330 to interpret signals received from the sensor(s) 366 and/or inertial sensors 399. In one embodiment, the sensors 366 and/or inertial sensors 399 output fully processed signals to the processor(s) 330. For example, the sensors 366 may output a distance, a detected/not detected signal, etc. using a single line interface or a multi-line interface. Similarly, inertial sensors 399 may output an acceleration value (e.g., in Gs). In another embodiment, the sensors 366 output, for example, positional data and/or object presence data (e.g., of a human body part) to the processors 330 without first processing the data. Similarly, inertial sensors 399 may output, for example, voltage values that can be interpreted as acceleration values. In either instance, the processors 330 may use the sensor circuitry 335 to process and/or interpret the received data. If data is received from multiple sensors 366 and/or inertial sensors 399, processing the data may include averaging the data, identifying a maximum from the data, or otherwise combining the data from the multiple sensors. In one embodiment, in which the sensors 366 include a sensor array, numerous sensors, or a touch panel, processing the data includes determining where on the user device the human body part is located from multiple sensor readings.

In one embodiment, antenna 388 (or 384) is used as a proximity sensor (e.g., as a sensor electrode for a proximity sensor). To enable the use of antenna 388 as a proximity sensor, another switch (not illustrated) disconnects the antenna 388 from power amp 386 (and thus from modem 322), and connects antenna 388 to sensor circuitry 335 and/or to a proximity sensor integrated circuit (not shown) that connects to sensor circuitry 335. While there is an electrical connection between sensor circuitry 335 and antenna 388, the antenna 388 provides signals to sensor circuitry 335. The sensor circuitry 335 processes the signals to determine whether a human body part is detected proximate to the user device. While there is an electrical connection between antenna 388 and power amp 386, antenna 388 may be used to transmit and receive information (e.g., to maintain a wireless connection). In one embodiment, by default the switch maintains an electrical connection between power amp 386 and antenna 388.

In one embodiment, processor 330 controls whether the switch provides an electrical connection between the sensor circuitry 335 and the antenna 388 or between the power amp 386 and the antenna 388. Alternatively, or in addition, modem 322 may control the switch. The switch may provide an electrical connection between sensor circuitry 335 and antenna 388 on a periodic or other basis (e.g., every 500 ms or ever 1 s). The electrical connection between the sensor circuitry 335 and the antenna 388 may then be sustained for a predetermined time period (e.g., 100 ms), after which the electrical connection between the antenna 388 and sensor circuitry 335 is terminated, and an electrical connection between the power amp 386 and the antenna 388 is established. In one embodiment, the user device determines when antenna 388 will not be sending or receiving data, at which point the switch establishes an electrical connection between antenna 388 and sensor circuitry 335.

Note that an additional switch (not shown) may be interposed between power amp 380 and antenna 384, which may function in the manner described above with reference to the other switch. The additional switch may have connections to sensor circuitry 335 and processor 330 as described for the other switch.

Figure 4:
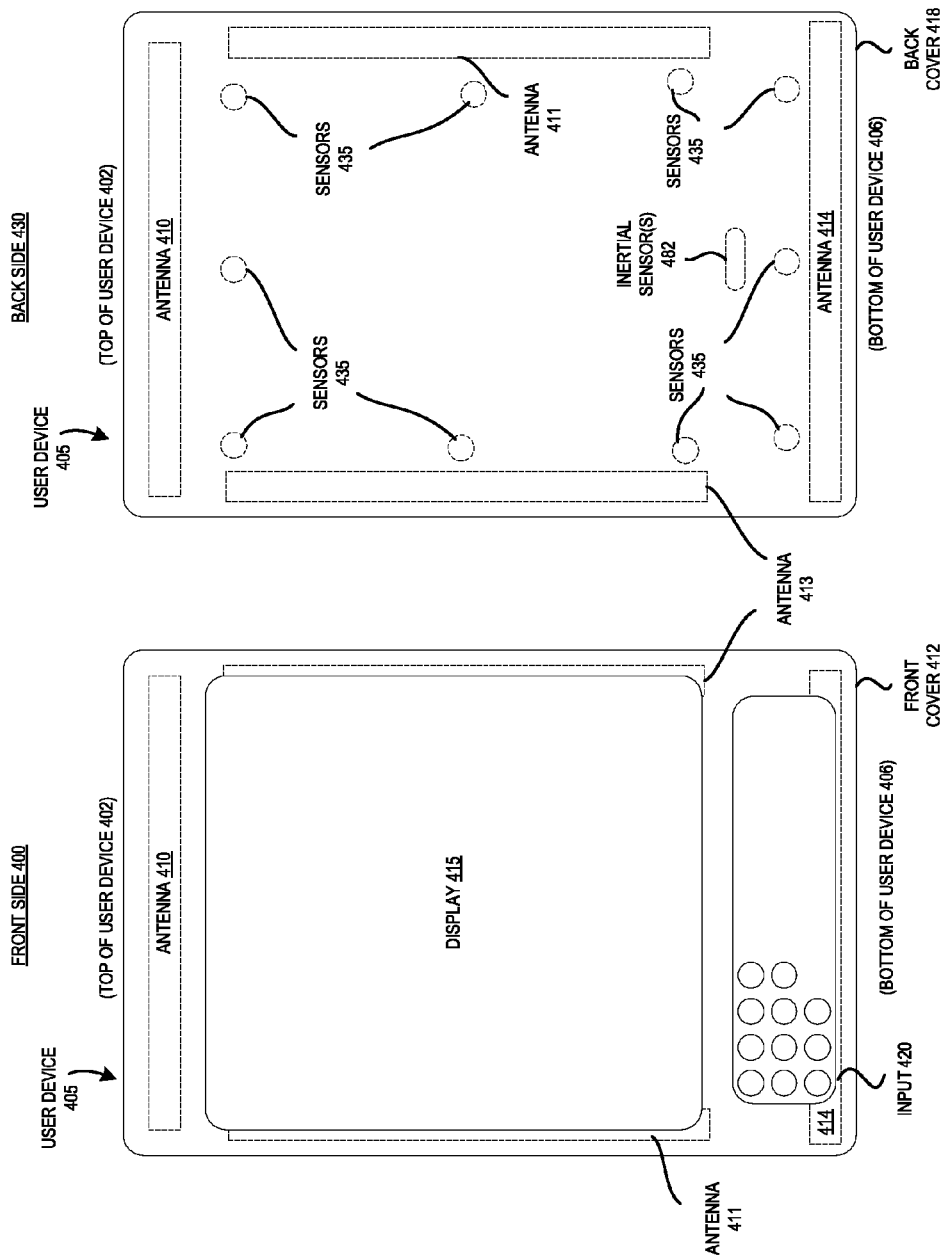
FIG. 4 illustrates an example of a front side and back side of a user device.

FIG. 4 illustrates an example of a front side 400 and back side 430 of a user device 405. The front side 400 includes a display 415 and optionally an input 420 housed in a front cover 412. The display 415 may use any available display technology, such as electronic ink (e-ink), liquid crystal display (LCD), transflective LCD, light emitting diodes (LED), laser phosphor displays (LSP), and so forth. The input 420 may include a keyboard, touch pad, or other input mechanism. In one embodiment, the display 415 and input 420 are combined into one or more touch screens.

Disposed inside the user device 405 are antennas 410, 411, 413, and 414, one or more sensors 435 and one or more inertial sensors 482. Note that, in some embodiments, the user device 405 may not include sensors 435, and, in other embodiments, the user device 405 may not include inertial sensors 482. As shown, the antenna 410 is positioned near a top 402 of the user device 405, the antenna 414 is positioned near a bottom 406 of the user device 405, the antennas 411 is positioned near one side of the user device 405 and the antenna 413 is positioned near another side of the user device 405. However, the antennas 410, 411, 413, and 414 may also be positioned at other locations. Also, less than four antennas may be used, such as two or more. In one embodiment, the antennas 410, 411, 413, and 414 are positioned less than approximately 15 cm apart, which is the distance at which interference is typically introduced between antennas in user devices such as mobile phones. Such minimal separation between the antennas can be achieved without interference problems in one embodiment of the present invention due to a fine grained control of transmit power levels provided by the power manager.

Disposed at a back side of the user device 405 are one or more sensors 435. The sensors 435 may be proximity sensors such as inductive sensors, capacitive sensors, magnetic sensors, infrared sensors, ultrasonic sensors, or the like. The sensors 435 may also be touch sensors such as a resistive touch sensor, a capacitive touch sensor, a mechanical touch sensor (e.g., a mechanical button), or the like. FIG. 4 illustrates ten sensors 435, but more or less sensors 435 may be used. Similarly, FIG. 4 illustrates one inertial sensor 482, but more than one inertial sensor 482 may be used. In addition, the positioning of these sensors may vary as would be appreciated by one of ordinary skill in the art having the benefit of this disclosure.

The one or more inertial sensors 482 may have fixed positions within the user device 405. The inertial sensors 482 may include gyroscope and/or accelerometer (e.g., a 3 axis accelerometer). The gyroscope and accelerometer may be separate sensors, or may be combined into a single sensor.

The antennas 410, 411, 413, and 414, sensors 435, and inertial sensors 482 are shown in the illustrated embodiment using dashed lines to indicate that these components are not on a surface of the user device 402 (e.g., that they are inside a back cover 418). However, in alternative embodiments these components may be on a surface of the user device 405.

Note that in one embodiment the sensors 435 are disposed proximate to the antennas to detect when a human body part is close to the antennas. This may include detecting a distance between one or more of the antennas and the human body part. The sensors 435 may be disposed in an approximately linear pattern in a rectangular pattern in proximity to the four antennas as shown in FIG. 4. Alternatively, the sensors 435 may be disposed in other patterns at the back side of the user device 405. Such additional patterns may include a square pattern, an elliptical pattern, a checkerboard pattern, or other pattern. The sensors 435 may be discrete sensors (as shown), or may be linear sensor arrays, other sensor arrays, a touch panel, slider sensors, or the like. The sensors 435 may also be a single proximity sensor. For example, a single proximity sensor may be included that is substantially equal to the size of the entire back 418 of the user device 405. As shown, the sensors 435 are disposed between the antenna 410 and the bottom 406 of the user device 405. However, one or more sensors 435 may also be disposed at other locations with relation to the four antennas, such as between the antenna 410 and the top 402 of the user device 405 (not illustrated). Similarly, additional sensors 435 may be disposed near the other antennas and the bottom and sides of the user device antenna 414 (not illustrated). Though sensors 435 are shown only at the back side 430 of the user device 405, the front side 400 of the user device 405 may also include other sensors. In one embodiment, as described above with reference to FIG. 3, one or more of the antennas 410, 411, 413, and 414 may function as proximity sensors. In such an embodiment, some or all of sensors 435 may be omitted. The sensor data from the sensors 435 can be used by the antenna deployment manager 200 to determine an orientation and to determine antenna deployment based on the orientation. The sensor data may also be used to throttle the power.

In one embodiment, the sensors 435 may be disposed on an underside of a non-conductive substrate, which may be a rigid substrate (e.g., a printed circuit board (PCB)) or a flexible substrate (e.g., a polyimide film, polyester film, or polyether ether ketone (PEEK) film). When multiple antennas 410, 41, 413, and 414 are used, sensors 435 may be positioned proximate to each antenna. In one embodiment, the sensors 435 are located 10 mm from the respective antennas. Alternatively, the sensors 435 may be disposed at different locations, and may even be disposed gradually further away from the respective antenna, such as one sensor at 10 mm, another at 15 mm, another at 20 mm, and another at 25 mm, for example. Depending on which of sensors detect a human body part and/or relative strengths of detection signals generated by the sensors, a distance between the human body part and antenna may be determined. Alternatively, the sensor data may be used in other ways to determine a distance between a particular antenna and the detected human body part.

The sensor 435 may also be disposed on inside of the back cover 418. In other embodiments, the sensors 435 may alternatively be positioned within the back cover 418 such that they are flush with the outer perimeter of the back cover 418, protrude outside of the back cover 418, or recede within the back cover 418. Some sensors 435 may also be attached to a front of the non-conductive substrate (e.g., a printed circuit board (PCB)) or to an inside of the front cover 412. The substrate may be a rigid substrate (e.g. PCB) or a flexible substrate (polyimide, polyester, polyether ether ketone, etc). The substrate may also have mounted thereon a sensor integrated circuit electrically connected to the sensors. The sensors may be spot sensors that have small sensing elements with a limited sensing range. The sensors may be strip sensor that have large sensing elements that are able to detect the proximity of a human body part across a large area, such as along a back right or left side of the user device (or a top or bottom side). In one embodiment, in which the strip sensor is a linear array of sensors or a slider sensor, the strip sensor is capable of identifying where the human body party, such as a hand, is positioned along the strip (e.g., nearer antenna 410, 411, 413, or 414).

Inertial sensors 482 may be attached to an inside of the front cover 412 or back cover 418, attached to a top side or bottom side of a non-conductive substrate, or attached to some other component of the user device 405. Additionally, inertial sensors 482 may be positioned at a top, bottom, middle, side, or other location on the user device 405.

In one embodiment, a user's hand or leg may be in contact with the back side 418 of the user device 405. During transmission of data, antenna 410, for example, emits a radio frequency (RF) field that may be absorbed by the portions of the human body (e.g., by the hand and/or leg). The amount of power/radiation that may be absorbed from the RF field by the portions of the human body are based on a distance of the human body part from the antenna 410. The power of the RF field drops off at a rate of $1/d^2$, where d is distance from the antenna 410. Accordingly, the closer a human body part is to the antenna 410, the more radiation that may be absorbed. The different body parts may absorb different amounts of radiation, and the sensors 435 may be used to determine which antenna should be used for data transmission and the antenna deployment manager can switch the deployment of the antennas accordingly based on the proximity events. For example, the leg may only absorb a nominal amount of radiation from the RF field because of the distance between the antenna 410 and the leg. However, the hand may be close enough to the antenna 410 to possibly absorb elevated amounts of radiation. In this case, if the hand were positioned over one of sensors 435, the sensors 435 detect the presence of the hand. In some embodiments, depending on the sensor type, the sensors may detect the presence of a human body part even if the human body part is not in direct contact with the sensor 435 or not positioned directly over the sensor 435. For example, capacitive sensors, inductive sensors, optical sensors, ultrasonic sensors and the like may detect objects that are proximate to, but not touching, the sensors. If sensors 435 are positioned across the entire back side 418 (e.g., in a sensor array), then signals from multiple sensors can be processed to visualize a size, shape and/or position of a detected object. This may enable the user device 405 to identify whether a detected object is a human body part, as well as a distance between the human body part and the antenna 410. If the antenna 410 acts as a sensor, it may be sensitive enough to detect the proximity of hand and/or leg, for example.

Upon detection of the hand, the user device 405 may select one of the other antennas 411, 413, and 414 as the Tx antenna, instead of the antenna 410, which was previously selected as the Tx antenna. For example, the hand may be holding the user device 405 at the tope 402 of the user device 405, and the user device 405 can select antenna 414 to be the Tx antenna for data transmission, and the antenna 410 can be selected for data reception.

The sensor data may be used to determine an orientation of the user device 505 relative to the user. The orientation may be used to determine that the antenna 410 is in a top position and should be selected as the Tx antenna. Alternatively, the sensor day may be used to determine that the antenna 410 (or any of the other antennas 411, 413, and 414) is the farthest away from the detected human body part and should be selected as the Tx antenna. The sensor data may be used to determine a new orientation, such as when a user rotates the user device 405 and grabs another side of the user device. In response, the antenna deployment switching may be performed to switch the Tx antenna to the appropriate antenna based on the new orientation. Embodiments of antenna deployment switching are discussed in greater detail below with reference to FIGS. 5-13.

Figure 5:
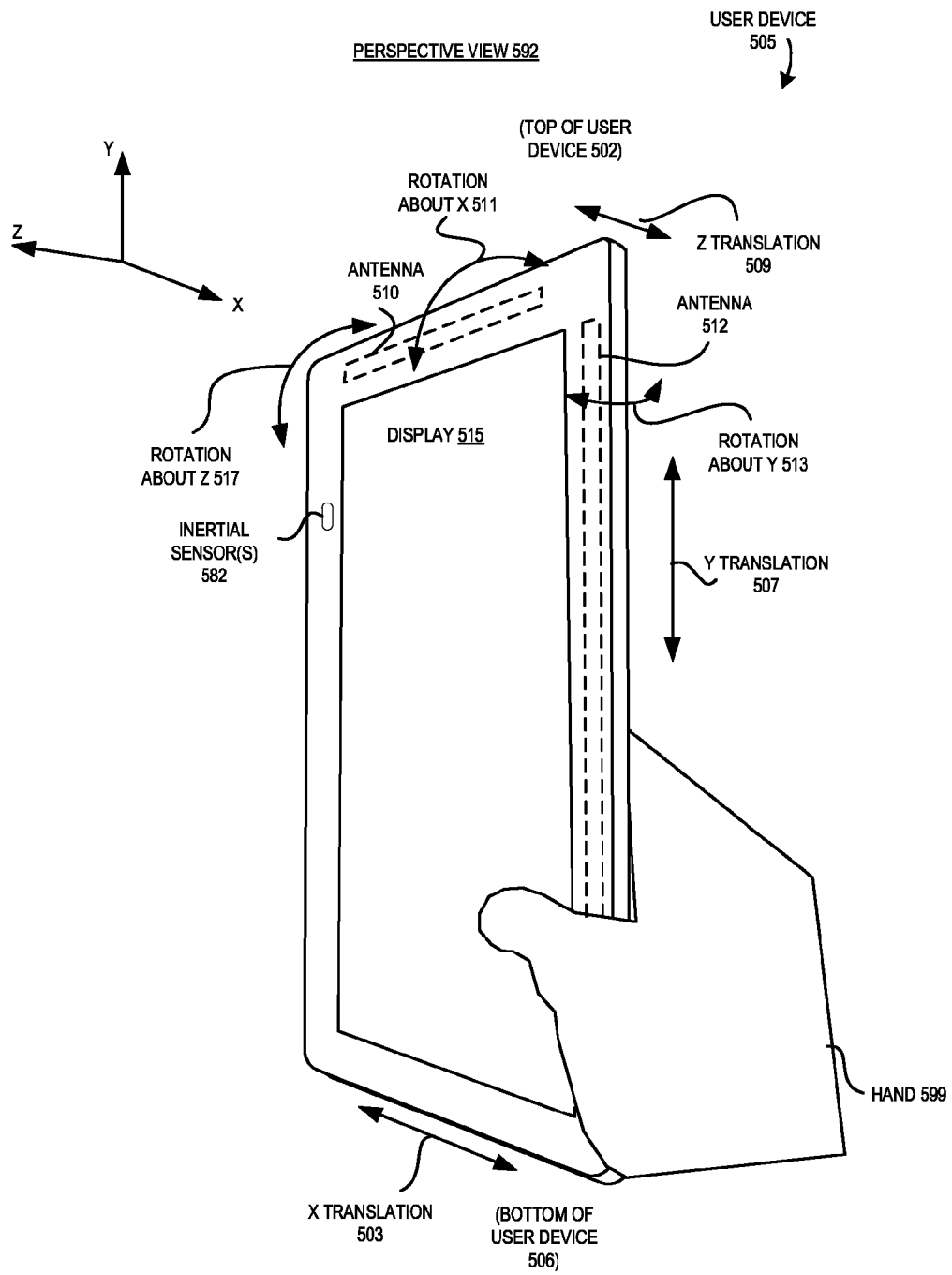
FIG. 5 illustrates a perspective view of a user device held in the hand of a user in a first orientation.
Figure 6:
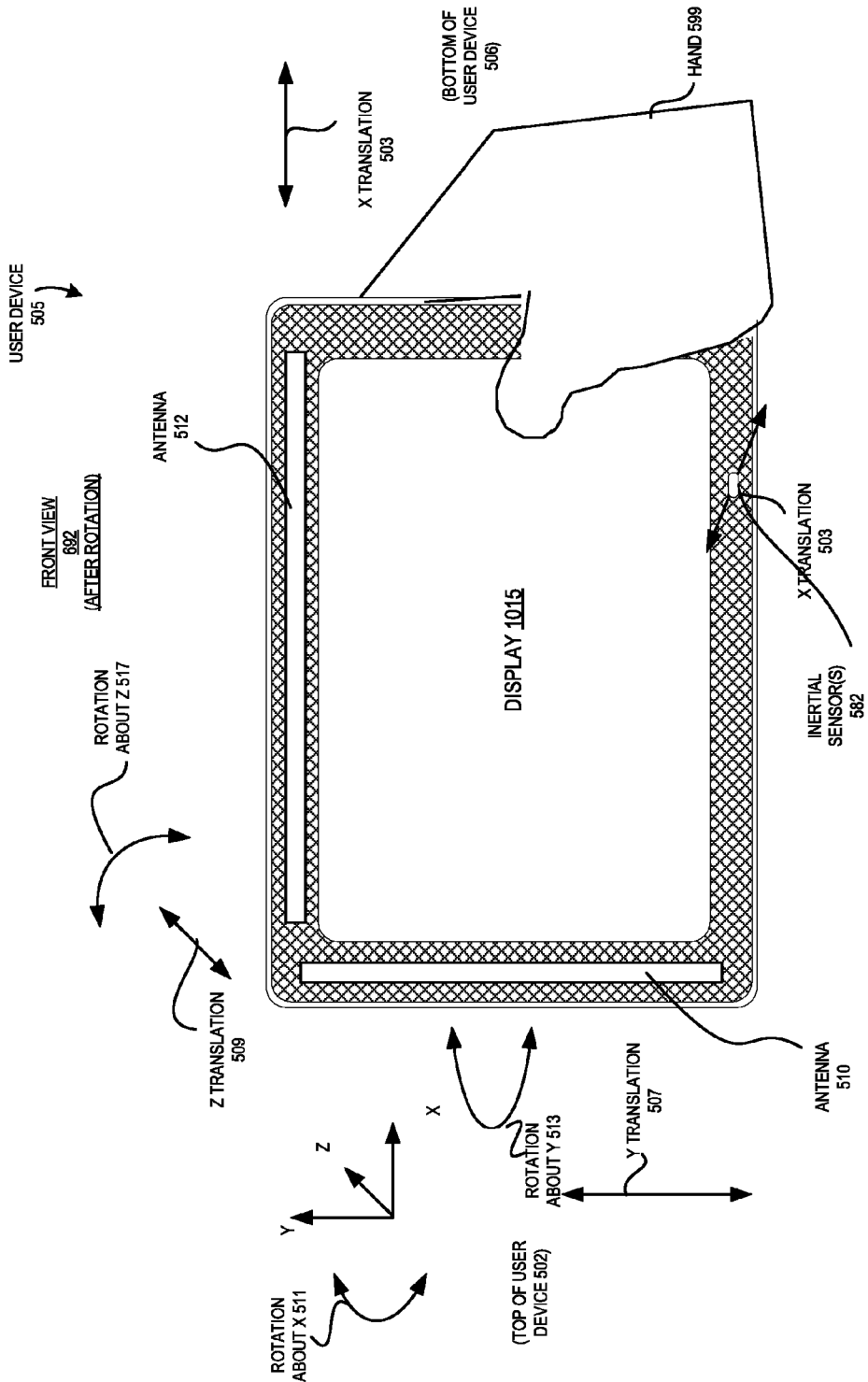
FIG. 6 illustrates a front view of the user device held in the hand of the user in a second orientation.

FIG. 5 illustrates a perspective view 592 of a user device 505 held in the hand of a user. As the user holds the user device 505, the user's hand 599 is not perfectly still. For example, the user's hand 599 may shake or otherwise move linearly in one or more directions (e.g., in an X direction, Y direction and/or Z direction). This linear (translational) motion may be registered by the inertial sensors 582 as linear acceleration in the X direction 503, linear acceleration in the Y direction 507 and linear acceleration in the Z direction 509. The user's hand 599 may also exhibit angular motion (e.g., about the X-axis, about the Y-axis and/or about the Z-axis). This motion may be registered by the inertial sensors as a rotation (or angular acceleration) about the Y-axis 513 (changes in roll), rotation (or angular acceleration) about the X-axis 511 (changes in pitch) and rotation (or angular acceleration) about the Z-axis 517 (changes in yaw). These detected motions may be used by the user device 505 to detect the presence of the hand 599 (or other human body part). These detected motions may also be used by the user device 505 to determine an orientation of the user device. The motion data may be used to determine that the user device 505 is oriented in a first position with the antenna 510 being in a top position. As shown in FIG. 6, the user device 505 may be rotated and held by the user in a different orientation. The motion data may be used by the user device 505 to determine the new orientation and switch the antenna deployment based on the new orientation as described below.

In one embodiment, the inertial sensors 582 gather motion data over a sample period, and compare the motion data to human body part presence criteria. The human body part presence criteria may include linear acceleration thresholds and/or angular acceleration thresholds. If the human body part presence criteria are satisfied (e.g., linear accelerations are above a linear acceleration threshold and angular accelerations are above an angular acceleration threshold), the user device 505 may determine that a human body part is detected proximate to the user device 505. The user device 505 may also determine the orientation. Upon such a determination, determine which antenna should be the Tx antenna. The antenna deployment manager may select the antenna 510 as the Tx antenna since it is in the top position. Alternatively, the antenna deployment manager may select the antenna 510 since it is farthest away from the user's hand regardless of it being in the top position.

In one embodiment, the user device 505 determines whether a human body part is detected proximate to the user device 505 (e.g., whether the user device is held in a hand or resting on a leg) based on a combination of data from sensors 535 and from inertial sensors 582. In another embodiment, the user device 505 determines an orientation of the user device based on a combination of data from sensors 535 and from inertial sensors 582. For example, capacitive sensors may falsely detect the presence of a human body part when the user device 505 is resting on a metal surface. However, while the user device 505 is resting on the metal surface, the inertial sensors 582 would not detect the presence of a human body part. Similarly, inertial sensor 582 may falsely detect the presence of a human body part when the user device is in a moving vehicle, such as a car, train, bus, airplane, boat, etc., due to motions of the vehicle. However, while the user device is resting in the moving vehicle, sensors 535 may indicate that no presence of a human body part is detected. Thus, accuracy of detecting the presence of a human body part may be increased by using both the sensors 535 and inertial sensors 582. Detecting the presence of the human body part may be an initial determination before determining an orientation of the user device to perform antenna deployment switching.

The linear accelerations and angular accelerations detected by the inertial sensors 582 may differ depending on where a user is holding the user device 505. For example, when the user's hand 599 is holding the user device 505 near a bottom of the user device 506, inertial sensors 582 may detect first angular accelerations and linear accelerations, and when the user's hand 599 is holding the user device 505 near a top of the user device 502, inertial sensors 582 may detect second angular accelerations and linear accelerations. In one embodiment, if the inertial sensors 582 are near a top of the user device 502, then the first linear and angular accelerations may have greater magnitudes than the second linear and angular accelerations.

In one embodiment, when the presence of a human body part is detected, user device 505 uses motion data from the inertial sensors 582 to determine whether the human body part is near the bottom 506 of the user device or near the top 502 of the user device. If the human body part is near the top of the user device 502 (near antenna 510), antenna deployment switching may be initiated to switch the Tx antenna to antenna 512. However, if the human body part is near the bottom of the user device 506, antenna deployment switching may be initiated to switch the Tx antenna to 510. In other embodiments, the user device may include four antennas, one on each side, and the antenna deployment switching can be used to switch the Tx antenna to any one of the four antennas based on the motion data and/or sensor data. Also, as described herein, the antenna deployment switching may also use the receive signal conditions of the antennas as another parameter for selecting the appropriate antennas for data transmission and data reception.

In one embodiment, when the user device 505 is resting against a leg of a user, the user's leg may be relatively motionless. Accordingly, the inertial sensors 582 may not detect motion of the user device 505 sufficient to identify the presence of a human body part when the user device 505 is resting against a user's leg. However, it has been observed that the user device 505, when tilted at particular angles, has a high probability of being held by a user.

Accordingly, in one embodiment the inertial sensors 582 are used to determine an angle of the user device 505 with respect to gravity. Gravity exerts a downward force that is measured by the inertial sensors 582 as an acceleration. When the user device 505 is relatively motionless, the acceleration caused by gravity may be identified, and the angle of the user device 505 with respect to gravity may be determined. In one embodiment, if the angle with respect to gravity has a value that is less than a threshold angle (e.g., 80 degrees), the presence of a human body part is detected. Alternatively, the angle may be defined as an angle relative to horizontal (a plane normal to gravity), and the presence of a human body part may be detected when the angle with respect to horizontal is greater than a threshold value (e.g., greater than 10 degrees). Thus, the presence of a human body part may be detected using the inertial sensors 582 even when the user device 505 is motionless.

FIG. 6 illustrates a front view of the user device 505 held in the hand of the user in a second orientation. In this orientation, the user device 505 is held in the user such that the antenna 510 is not in the top position, and the antenna 512 is the closest to the hand. The antenna deployment manager 200 can determine the new orientation and switch the Tx antenna to be the antenna 510 at the top position. The antenna 512 can be selected as an Rx antenna. In embodiments of the user device 505 having four antennas, the antenna deployment manager 200 can select antennas for diversity or MIMO configurations as described herein.

Figure 7:
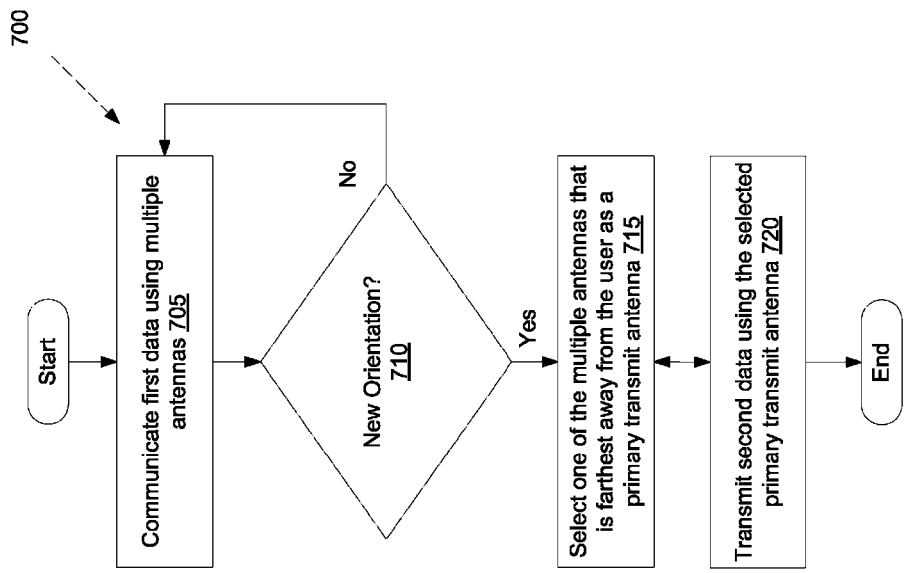
FIG. 7 is a flow diagram of an embodiment of a method for antenna deployment switching.

FIG. 7 is a flow diagram of an embodiment of a method 700 for antenna deployment switching. At block 705 of method 700, a user device communicates first data using multiple antennas disposed at different locations. The user device is in a first orientation with respect to a user while communicating the first data. The user device determines if there is a new orientation of user device (block 710). The new orientation may be detected if the user changes how the user holds the user device, if the user rotates the user device, or other motions of the user device. In one embodiment, the new orientation may be determined based on sensor data, motion data, signal strength conditions, or any combination thereof as described herein. In one embodiment, the user device determines there is a new orientation when the difference between the new orientation and the previous orientation is above a specified threshold. Alternatively, the user device can use other measures to determine whether the orientation is changed. If at block 710 there is no new orientation, the user device returns to block 705 to communicate data using multiple antennas. However, if at block 710 there is a new orientation, the user device selects one of the multiple antennas that is farthest away from the user device as a primary transmit antenna (block 715), and transmits second data using the selected primary transmit antenna (block 720). It should be noted that first data and second data are used to indicate that same data is not necessarily being retransmitted. Rather, the data may be data of a data stream being transmitted by the user device. For example, the user device may normally or initially transmit the data stream with the first transmit power, and when the user device determines to adjust the first transmit power level to the second transmit power level, the user device can continue to transmit later portions of the data stream using the second transmit power as would be appreciated by one of ordinary skill in the art having the benefit of this disclosure.

Figure 8:
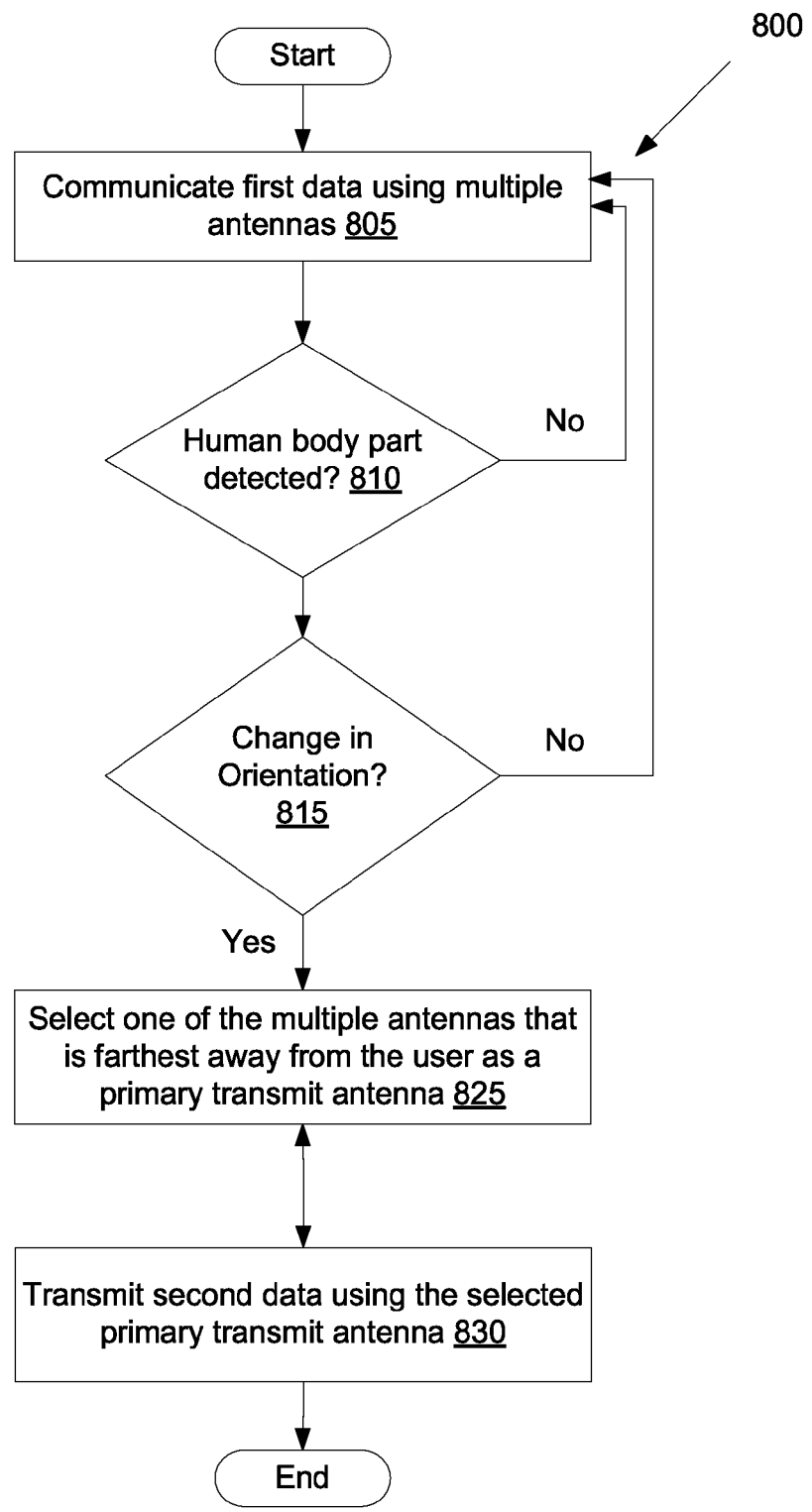
FIG. 8 is a flow diagram of another embodiment of a method for antenna deployment switching.

FIG. 8 is a flow diagram of another embodiment of a method 800 for antenna deployment switching. At block 805 of method 800, a user device communicates first data using multiple antennas disposed at different locations. The user device is in a first orientation with respect to a user while communicating the first data. The user device determines if a human body part is detected proximate to the user device (block 810). If not, the user device returns to block 805 to communicate data using multiple antennas. However, if at block 810, the human body part is detected, the user device determines if there is a new orientation of user device (block 815). The new orientation may be detected if the user changes how the user holds the user device, if the user rotates the user device, or other motions of the user device. In one embodiment, the new orientation may be determined based on sensor data, motion data, signal strength conditions, or any combination thereof as described herein. If at block 815 there is no new orientation, the user device returns to block 805 to communicate data using multiple antennas. However, if at block 815 there is a new orientation, the user device selects one of the multiple antennas that is farthest away from the user device as a primary transmit antenna (block 825), and transmits second data using the selected primary transmit antenna (block 830).

Figure 9:
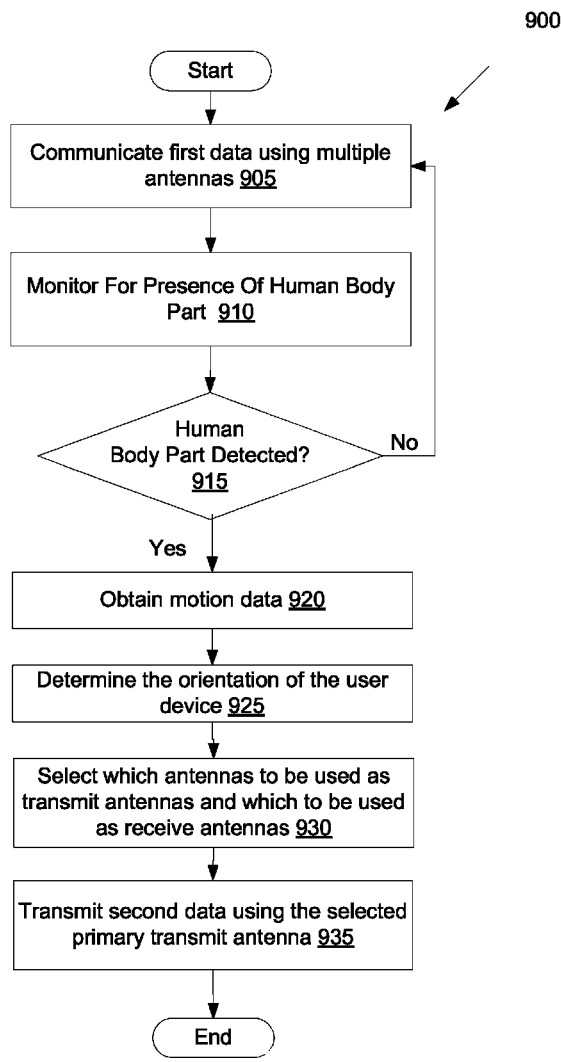
FIG. 9 is a flow diagram of an embodiment of a method for antenna deployment switching based on motion data.

FIG. 9 is a flow diagram of an embodiment of a method 900 for antenna deployment switching based on motion data. At block 905 of method 900, a user device communicates first data using multiple antennas disposed at different locations. The user device is in a first orientation with respect to a user while communicating the first data. The user device monitors for the presence of the human body part (block 910). If at block 915, the human body part is not detected, the user device returns to block 905 to communicate data using multiple antennas. However, if at block 915, the human body part is detected, the user device obtains motion data (block 920), and determine the orientation of the user device (block 925). Based on the orientation, the user device selects which antennas to be used as transmit antennas and which antennas to be used as receive antennas (block 930). The user device then communicates second data using the selected antennas (block 935).

In the depicted embodiment, the user device determines the orientation by obtaining the motion data at block 920, and determines, based on the motion data, the orientation of the user device (block 925). In a further embodiment, the user device determines a tilt angle of the user device based on the motion data and determines whether the title angle is beyond a tilt angle threshold to determine the orientation of the user device relative to the user. In another embodiment, the user device determines angular accelerations of the user device, determines linear accelerations of the user device, and determines the orientation of the user device based on the angular and linear accelerations. In other embodiments, just angular accelerations or just linear accelerations may be used. In another embodiment, the user device determines the orientation from sensor data from one or more proximity sensors. In a further embodiment, the user device detects a human body part proximate to the user device based on the sensor data from the proximity sensor. The user device, in response to detecting the human body part, determines a position of the human body part, and then determines an orientation of the user device based on the position of the detected human body part. In another embodiment, the user device determines a first distance between a first proximity sensor disposed on or within the user device and a human body part detected proximate to the user device by the first proximity sensor. The user device also determines a second distance between a second proximity sensor disposed on or within the user device and the human body part detected proximate to the user device by the second proximity sensor. Then the user device determines the orientation of the user device using the first and second distances.

In another embodiment, the user device determines the orientation from both sensor data and motion data. The sensor data may be obtained from one or more proximity sensors and the motion data may be obtained from one or more inertial sensors.

Figure 10:
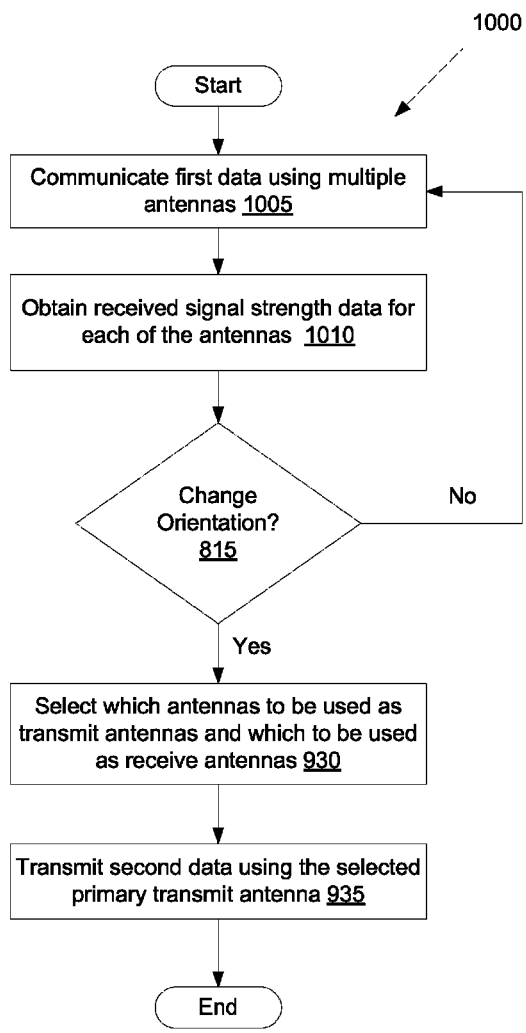
FIG. 10 is a flow diagram of an embodiment of a method for antenna deployment switching based on receive signal strength data.

FIG. 10 is a flow diagram of an embodiment of a method 1000 for antenna deployment switching based on receive signal strength data. At block 1005 of method 1000, a user device communicates first data using multiple antennas disposed at different locations. The user device is in a first orientation with respect to a user while communicating the first data. The user device obtains receive signal strength data for each of the antennas (block 1010). Based on the received signal strength data, the user device determines if the user device has changed orientation relative to the user (block 1015). If at block 1015 the orientation has not changed, the user device returns to block 1005 to communicate data using multiple antennas. However, if at block 1015, the orientation has been changed, the user device selects which antennas to be used as transmit antennas and which antennas to be used as receive antennas based on the receive signal strength data (block 1030). The user device then communicates second data using the selected antennas (block 1035).

In one embodiment, the user device monitors a RSSI for each of the antennas, and selects the antennas based on which of the antennas has a highest RSSI. In another embodiment, the user device can select a second transmit antenna. The second antennas can be selected based on which of the antennas has the second highest RSSI. The second transmit antennas can be used as a diversity antennas in diversity configurations or may be a second transmit antennas of a MIMO configuration. Alternatively, the RSSI can be used in connection with the sensor data and/or the motion data to make determines of orientations and how to switch the antenna deployment based on the determined orientation.

Figure 11:
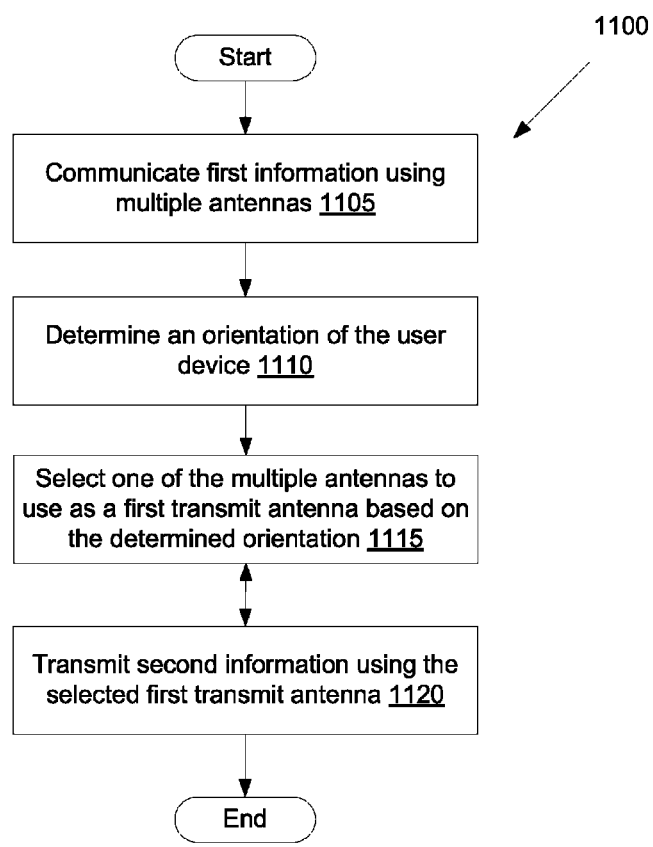
FIG. 11 is a flow diagram of another embodiment of a method for antenna deployment switching.

FIG. 11 is a flow diagram of another embodiment of a method 1100 for antenna deployment switching. At block 1105 of method 1100, a user device communicates first information using multiple antennas of the user device. The user device determines an orientation of the user device (block 110), and selects one of the multiple antennas to use as a first transmit antenna based on the determined orientation (block 1115). The user device transmits second information using the selected first transmit antenna (block 1120). In one embodiment, the first transmit antennas is the antenna located at a top of the user device, relative to the ground based on the determined orientation. Despite changes in the orientation of the user device, the user device maintains the first transmit antennas as the antennas in the top position.

In a further embodiment, the user device includes four antennas disposed at each side of the user device. In another embodiment, the user device includes three antennas. In another embodiment, the user device includes two antennas. Alternatively, more than four antennas may be used as would be appreciated by one of ordinary skill in the art having the benefit of this disclosure.

Figure 12:
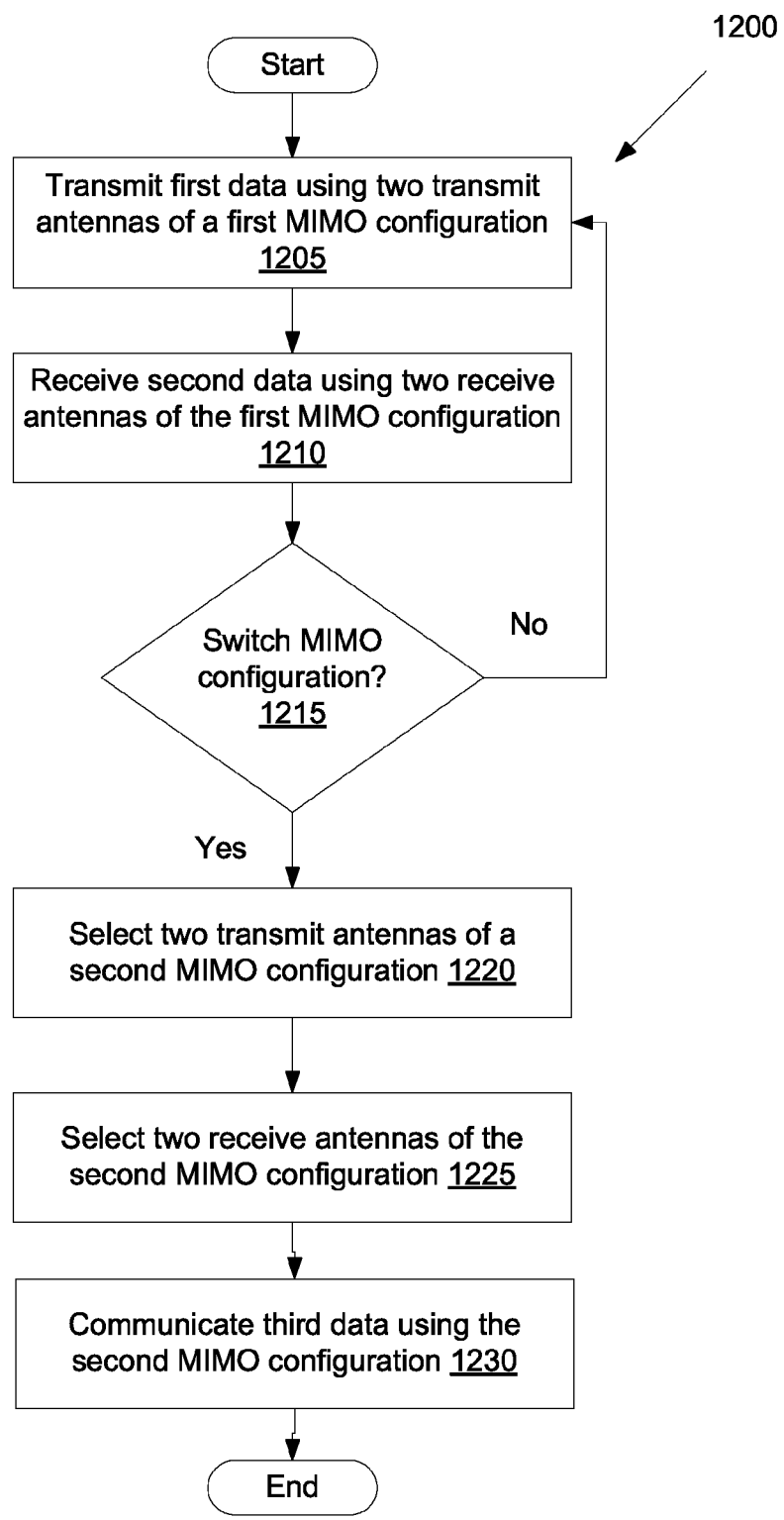
FIG. 12 is a flow diagram of an embodiment of a method for antenna deployment switching for MIMO configurations.

FIG. 12 is a flow diagram of an embodiment of a method 1200 for antenna deployment switching for MIMO configurations. At block 1205 of method 1200, a user device transmits first data using two or more transmit antennas of a first MIMO configuration. The user device also receives second data using two or more receive antennas of the first MIMO configuration (block 1210). The user device determines if the configuration should be switched (block 1215), such as by determining if there is a change in orientation, a change in receive signal strength condition (e.g., RSSIs of the antennas), a change in transmitting or receiving conditions, or any combination thereof. If the MIMO configuration is not to be switched, the user device returns to block 1205 to transmit and receive additional data using the first MIMO configuration. However, if the MIMO configuration is to be switched at block 1215, the user device selects two different transmit antennas of a second MIMO configuration (block 1220) and selects two different receive antennas of the second MIMO configuration (block 1225). It should be noted that the transmit antennas of the first and second MIMO configurations may be different combination of transmit antennas. For example, one transmit antenna may be the primary transmit antennas in the first MIMO configuration, but a second transmit antenna in the second MIMO configuration, or vice versa. The transmit antennas of the first configuration may also become receive antennas in the second MIMO configuration. Alternatively, other combinations of antennas may be selected as would be appreciated by one of ordinary skill in the art having the benefit of this disclosure. It should also be noted that more or less antennas than four may be used.

After selecting the transmit antennas and receive antennas of the second MIMO configuration, the user device communicates third data using the second MIMO configuration (block 1230). The third data may include some data that is being transmitted by the transmit antennas of the second MIMO configuration and some data that is being received by the receive antennas of the second MIMO configuration.

In another embodiment, the user device can switch different types of MIMO configurations, such as a first SIMO configuration to a second SIMO configuration, or a first MISO configuration to a second MISO configuration as would be appreciated by one of ordinary skill in the art having the benefit of this disclosure. In the SIMO configurations, there is a single transmit antennas and multiple receive antennas. In the MISO configurations, there are multiple transmit antennas and a single receive antennas.

Figure 13:
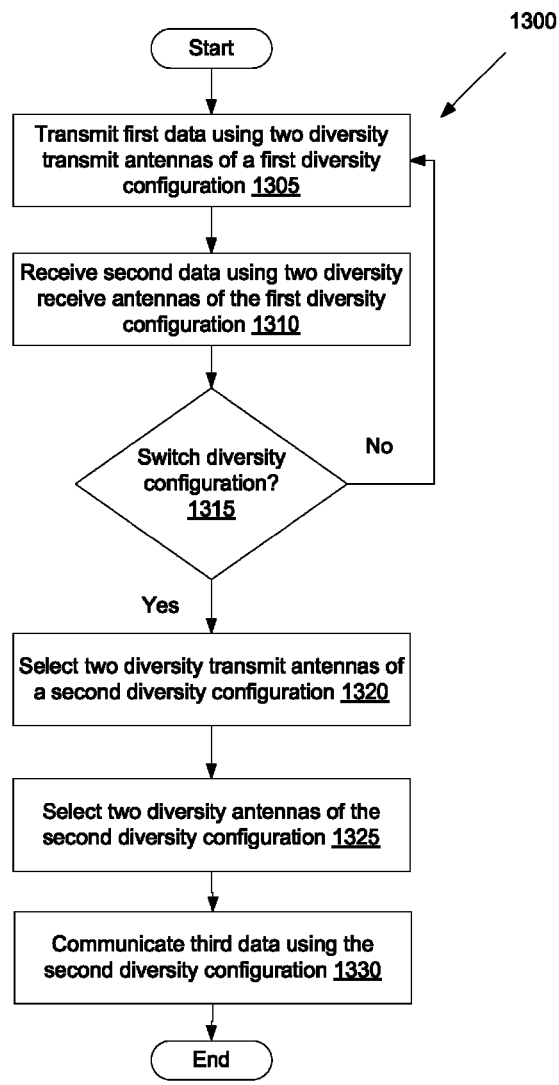
FIG. 13 is a flow diagram of an embodiment of a method for antenna deployment switching for diversity configurations.

FIG. 13 is a flow diagram of an embodiment of a method 1300 for antenna deployment switching for diversity configurations. At block 1305 of method 1300, a user device transmits first data using two or more diversity transmit antennas of a first diversity configuration. The user device also receives second data using two or more diversity receive antennas of the first diversity configuration (block 1310). The user device determines if the configuration should be switched (block 1315), such as by determining if there is a change in orientation, a change in receive signal strength condition (e.g., RSSIs of the antennas), a change in transmitting or receiving conditions, or any combination thereof. If the diversity configuration is not to be switched, the user device returns to block 1305 to transmit and receive additional data using the first diversity configuration. However, if the diversity configuration is to be switched at block 1315, the user device selects two different diversity transmit antennas of a second diversity configuration (block 1320) and selects two different diversity receive antennas of the second diversity configuration (block 1325). It should be noted that the diversity transmit antennas of the first and second diversity configurations may be different combination of transmit antennas. For example, one diversity transmit antenna may be the primary transmit antennas in the first diversity configuration, but a second diversity transmit antenna in the second diversity configuration, or vice versa. The diversity transmit antennas of the first configuration may also become diversity receive antennas in the second diversity configuration. Alternatively, other combinations of diversity antennas may be selected as would be appreciated by one of ordinary skill in the art having the benefit of this disclosure. It should also be noted that more or less antennas than four may be used.

After selecting the diversity transmit antennas and diversity receive antennas of the second diversity configuration, the user device communicates third data using the second diversity configuration (block 1330). The third data may include some data that is being transmitted by the diversity transmit antennas of the second diversity configuration and some data that is being received by the diversity receive antennas of the second diversity configuration.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "radiating," "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present invention should, therefore, be determined with reference to the appended claims, along with the full scope of equivalents to which such claims are entitled.

What is claimed is:

1. A method, implemented by a user device programmed to perform the following, comprising:
    communicating first data using two or more of a plurality of antennas in a first multi-channel configuration; wherein the communicating the first data comprises at least one of:
        transmitting the first data using a first subset of the plurality of antennas as one or more transmit antennas in the first multi-channel configuration; or
        receiving the first data using a second subset of the plurality of antennas as one or more receive antennas in the first multi-channel configuration;
    detecting an object proximate to the user device;
    determining an orientation of the user device relative to the object;
    switching to a second multi-channel configuration based on the orientation of the user device relative to the object, wherein the switching to the second antenna configuration, comprises:
        selecting, as a primary transmit antenna for the second configuration, one of the plurality of antennas that is farthest away from the object;
        selecting a third subset of the plurality of antennas as the one or more transmit antennas in the second multi-channel configuration, wherein the third subset comprises at least the primary transmit antenna; and
        selecting a fourth subset of the plurality of antennas as the one or more receive antennas in the second multi-channel configuration; and
    communicating second data using the second antenna configuration, wherein the communicating the second data comprises at least one of:
        transmitting the second data using the third subset of the one or more transmit antennas in the second multi-channel configuration; or
        receiving the second data using the fourth subset of the one or more receive antennas in the second multi-channel configuration.

2. The method of claim 1, wherein said determining the orientation of the user device comprises:
obtaining motion data from an inertial sensor included in the user device; and
determining, based on the motion data, the orientation of the user device relative to the object.

3. The method of claim 2, wherein said determining the orientation of the user device comprises:
determining at least one of angular accelerations or linear accelerations of the user device; and
determining the orientation of the user device relative to the object based on the at least one of the angular accelerations or linear accelerations.

4. The method of claim 1, wherein said determining the orientation of the user device comprises:
determining a tilt angle of the user device; and
determining whether the tilt angle is beyond a tilt angle threshold to determine the orientation of the user device relative to the object.

5. The method of claim 1, wherein said determining the orientation of the user device comprises determining the orientation using sensor data from a proximity sensor.

6. The method of claim 5, wherein said determining the orientation using the sensor data comprises:
detecting the object proximate to the user device based on the sensor data from the proximity sensor;
in response to said detecting the object, determining a position of the detected object; and
determining the orientation of the user device based on the position of the detected object.

7. The method of claim 5, wherein said determining the orientation using the sensor data comprises:
determining a first distance between a first proximity sensor disposed on or within the user device and the object detected proximate to the first proximity sensor;
determining a second distance between a second proximity sensor disposed on or within the user device and the object detected proximate to the second proximity sensor; and
determining the orientation of the user device using the first and second distances.

8. The method of claim 1, wherein said determining the orientation of the user device comprises determining the orientation using sensor data from a proximity sensor and motion data from an inertial sensor.

9. The method of claim 1, wherein said selecting comprises selecting the primary transmit antenna based on received signal strength data and the orientation of the user device.

10. The method of claim 9, wherein selecting the primary transmit antenna based on the received signal strength data comprises:
monitoring a received signal strength indicator (RSSI) for each of the plurality of antennas; and
selecting the one antenna based on which of the plurality of antennas has a highest RSSI.

11. The method of claim 1, wherein the switching to the second multi-channel configuration further comprises selecting another one of the plurality of antennas as a second primary transmit antenna.

12. The method of claim 11, further comprising transmitting the second data using the selected second primary transmit antenna.

13. The method of claim 1, wherein the first multi-channel configuration is a first Multiple-Input and Multiple-Output (MIMO) configuration and the second multi-channel configuration is a second MIMO configuration.

14. The method of claim 1, wherein the first multi-channel configuration is a first Multiple-Input and Single-Output (MISO) configuration and the second multi-channel configuration is a second MISO configuration.

15. The method of claim 1, wherein the first multi-channel configuration is a first single-input and multiple-output (SIMO) configuration and the second multi-channel configuration is a second SIMO configuration.

16. A non-transitory computer-readable storage medium storing instructions that when executed by a user device computing system cause the computing system to perform operations comprising:
communicating first information using two or more of a plurality of antennas; wherein said communicating the first information using the plurality of antennas comprises at least one of:
transmitting first data using two or more of the plurality of antennas as transmit antennas of a first Multiple-Input and Multiple-Output (MIMO) configuration; or
receiving second data using two or more of the plurality of antennas as receive antennas of the first MIMO configuration;
determining an orientation of the user device computing system;
switching the first MIMO configuration to a second MIMO configuration based on the orientation of the computing system, wherein the switching comprises:
selecting one of the plurality of antennas as a first transmit antenna of the second MIMO configuration based on the orientation of the computing system;
selecting one or more additional ones of the plurality of antennas as the other one or more of the transmit antennas of the second MIMO configuration; and
selecting two or more of the plurality of antennas as the receive antennas of the second MIMO configuration; and
transmitting third data using the two or more transmit antennas of second MIMO configuration.

17. A non-transitory computer-readable storage medium storing instructions that when executed by a user device computing system cause the computing system to perform operations comprising:
communicating first information using two or more of a plurality of antennas; wherein said communicating the first information using the plurality of antennas comprises at least one of:
transmitting first data using two or more of the plurality of antennas as transmit antennas of a first Multiple-Input and Single-Output (MISO) configuration; or
receiving second data using one of the plurality of antennas as a single receive antenna of the first MISO configuration;
determining an orientation of the user device computing system;
switching the first MISO configuration to a second MISO configuration based on the orientation of the computing system, wherein the switching comprises:
selecting one of the plurality of antennas as a first transmit antenna based on the orientation of the computing system;
selecting one or more additional ones of the plurality of antennas as the other one or more of the transmit antennas of the second MISO configuration; and
selecting another one of the plurality of antennas as the single receive antenna of the second MISO configuration; and transmitting third data using the two or more transmit antennas of second MISO configuration.

18. A non-transitory computer-readable storage medium storing instructions that when executed by a user device computing system cause the computing system to perform operations comprising:
communicating first information using two or more of a plurality of antennas; wherein said communicating the first information using the plurality of antennas comprises at least one of:
transmitting first data using one of the plurality of antennas as a single transmit antenna of a first single-input and multiple-output (SIMO) configuration; or
receiving second data using two or more of the plurality of antennas as receive antennas of the first SIMO configuration;
determining an orientation of the user device computing system;
switching the first SIMO configuration to a second SIMO configuration based on the orientation of the computing system, wherein the switching comprises:
selecting one of the plurality of antennas as a first transmit antenna based on the orientation of the computing system; and
selecting one or more additional ones of the plurality of antennas as the receive antennas of the second SIMO configuration; and
transmitting third data using the single transmit antenna of the second SIMO configuration.

19. A non-transitory computer-readable storage medium storing instructions that when executed by a user device computing system cause the computing system to perform operations, comprising:
communicating first information using two or more of a plurality of antennas; wherein said communicating the first information using the plurality of antennas comprises at least one of:
transmitting first data using two or more of the plurality of antennas as diversity transmit antennas in a first diversity configuration; or
receiving second data using one or more of the plurality of antennas as diversity receive antennas in the first diversity configuration;
determining an orientation of the user device computing system;
switching the first diversity configuration to a second diversity configuration based on the orientation of the computing system, wherein the switching comprises:
selecting one of the plurality of antennas as a first transmit antenna based on the orientation of the computing system;
selecting one or more additional ones of the plurality of antennas as the other ones of the diversity transmit antennas of the second diversity configuration; and
selecting another one or more of the plurality of antennas as the diversity antennas of the second diversity configuration; and
transmitting third data using the diversity transmit antennas of the second diversity configuration.

20. The computer-readable storage medium of claim 19, wherein the first transmit antenna is one of the plurality of antennas that is located at a top of the computing system, relative to the ground based on the determined orientation.

21. The computer-readable storage medium of claim 19, wherein the computing system is a tablet computer.

22. The computer-readable storage medium of claim 19, wherein computing system is at least one of an electronic book reader, a cellular telephone, a personal digital assistant, a portable media player, or a netbook.

23. The computer-readable storage medium of claim 19, wherein the plurality of antennas comprise at least three antennas.

24. A user device, comprising:
a plurality of antennas configured to communicate first information to and from the user device in a first multi-channel configuration in which a first subset of the plurality of antennas comprises one or more transmit antennas to transmit first data to communicate the first information and in which a second subset of the plurality of antennas comprises one or more receive antennas to receive second data to communicate the first information;
a switch coupled to the plurality of antennas; and
a processing component coupled to the switch, wherein the processing component is to execute an antenna manager to determine an orientation of the user device and to switch to a second multi-channel configuration based on the orientation of the user device relative to the object, wherein the antenna manager is further to;
select one of the plurality of antennas to use as a primary transmit antenna that is farthest away from the object
select a third subset of the plurality of antennas as the one or more transmit antennas in the second multi-channel configuration, wherein the third subset comprises at least the primary transmit antenna; and
select a fourth subset of the plurality of antennas as the one or more receive antennas in the second multi-channel configuration; and wherein the processing component is to communicate second information using the second antenna configuration in which the third subset is to transmit third data to communicate the second information and in which the fourth subset is to receive fourth data to communicate the second information.

25. The user device of claim 24, further comprising a sensor disposed on or within the user device.

26. The user device of claim 25, wherein the sensor is a proximity sensor, and wherein the processing component is to receive sensor data from the proximity sensor and to determine, based on the sensor data, the orientation of the user device.

27. The user device of claim 26, further comprising:
a modem, coupled to the primary transmit antenna via the switch, to transmit the first information via the primary transmit antenna in the first multi-channel configuration, wherein the processing component is a processor coupled to the modem,
wherein the processor executes the antenna manager, and wherein the processor is configured to:
detect an object proximate to the user device based on the sensor data from the proximity sensor;
in response to said detecting the object, determine a position of the object;
determine the orientation of the user device based on the position of the object; and
instruct the modem to transmit the second information via the primary transmit antenna in the second multi-channel configuration.

28. The user device of claim 25, wherein the sensor is an inertial sensor, and wherein the processing component is to receive motion data from the inertial sensor and to determine, based on the motion data, the orientation of the user device.

29. The user device of claim 28, wherein the inertial sensor comprises at least one of an accelerometer or a gyroscope.

30. The user device of claim 24, further comprising a modem in which the processing component resides, wherein the modem is coupled to the first transmit antenna via the switch, and the modem is to transmit the second information using the first transmit antenna.

31. The user device of claim 24, wherein the user device is a tablet computer.

32. The user device of claim 24, wherein the first multi-channel configuration is a first Multiple-Input and Multiple-Output (MIMO) configuration and the second multi-channel configuration is a second MIMO configuration.

33. The user device of claim 24, wherein the first multi-channel configuration is a first Multiple-Input and Single-Output (MISO) configuration and the second multi-channel configuration is a second MISO configuration.

34. The user device of claim 24, wherein the first multi-channel configuration is a first single-input and multiple-output (SIMO) configuration and the second multi-channel configuration is a second SIMO configuration.

* * * * *

UNITED STATES PATENT AND TRADEMARK OFFICE
CERTIFICATE OF CORRECTION

PATENT NO. : 8,515,496 B2
APPLICATION NO. : 13/326664
DATED : August 20, 2013
INVENTOR(S) : Zhaojun Cheng et al.

Page 1 of 1

It is certified that error appears in the above-identified patent and that said Letters Patent is hereby corrected as shown below:

In the Claims

Column 26, line 12, "operations comprising:" should be -- operations, comprising: --

Column 26, line 43, "operations comprising:" should be -- operations, comprising: --

Column 27, line 6, "operations comprising:" should be -- operations, comprising --

Signed and Sealed this
Twenty-second Day of October, 2013

Teresa Stanek Rea
*Deputy Director of the United States Patent and Trademark Office*